United States Patent
Washio et al.

(10) Patent No.: US 9,932,444 B2
(45) Date of Patent: Apr. 3, 2018

(54) SEMIAROMATIC POLYAMIDE, SEMIAROMATIC POLYAMIDE RESIN COMPOSITION, AND MOLDED ARTICLE

(71) Applicant: MITSUI CHEMICALS, INC., Minato-ku, Tokyo (JP)

(72) Inventors: Isao Washio, Chiba (JP); Hiroki Ebata, Yokohama (JP); Fumio Kageyama, Ichihara (JP); Toshitaka Kosaka, Otake (JP); Hideto Ogasawara, Sodegaura (JP); Akinori Amano, Chiba (JP); Nobuhiro Takizawa, Kamakura (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 28 days.

(21) Appl. No.: 14/441,954

(22) PCT Filed: Nov. 12, 2013

(86) PCT No.: PCT/JP2013/006663
§ 371 (c)(1),
(2) Date: May 11, 2015

(87) PCT Pub. No.: WO2014/073219
PCT Pub. Date: May 15, 2014

(65) Prior Publication Data
US 2015/0329670 A1    Nov. 19, 2015

(30) Foreign Application Priority Data

Nov. 12, 2012 (JP) ................. 2012-248592
Nov. 12, 2012 (JP) ................. 2012-248596
Jan. 31, 2013 (JP) ................. 2013-017052

(51) Int. Cl.
| | | |
|---|---|---|
| C08L 77/06 | (2006.01) |
| C08G 69/26 | (2006.01) |
| C08L 33/14 | (2006.01) |
| C08L 23/08 | (2006.01) |
| C08K 3/16 | (2006.01) |
| C08K 5/00 | (2006.01) |
| C08K 7/14 | (2006.01) |
| C08G 69/28 | (2006.01) |
| C08F 255/00 | (2006.01) |
| C08L 51/06 | (2006.01) |

(52) U.S. Cl.
CPC ............ C08G 69/26 (2013.01); C08F 255/00 (2013.01); C08G 69/265 (2013.01); C08G 69/28 (2013.01); C08K 3/16 (2013.01); C08K 5/005 (2013.01); C08K 7/14 (2013.01); C08L 23/0815 (2013.01); C08L 33/14 (2013.01); C08L 77/06 (2013.01); C08L 51/06 (2013.01)

(58) Field of Classification Search
None
See application file for complete search history.

(56) References Cited

U.S. PATENT DOCUMENTS

| | | | | |
|---|---|---|---|---|
| 5,760,167 | A * | 6/1998 | Yuo | C08G 69/265 428/357 |
| 2003/0150503 | A1 | 8/2003 | Ito | |
| 2004/0126523 | A1 | 7/2004 | Masuda et al. | |
| 2008/0241562 | A1 | 10/2008 | Bushelman et al. | |
| 2010/0314793 | A1 | 12/2010 | Bersted et al. | |
| 2011/0105683 | A1 | 5/2011 | Kato et al. | |
| 2011/0155359 | A1* | 6/2011 | Doshi | B32B 1/08 165/180 |

FOREIGN PATENT DOCUMENTS

| | | |
|---|---|---|
| CN | 102408704 A | 4/2012 |
| JP | S40-005233 | 3/1965 |
| JP | 60-170664 A | 9/1985 |
| JP | 3-126725 A | 5/1991 |
| JP | 5-230205 A | 9/1992 |
| JP | 5-339494 A | 12/1993 |
| JP | 10-138372 A | 5/1998 |
| JP | 3024269 B2 | 3/2000 |
| JP | 2003-110736 A | 4/2003 |
| JP | 2003-287165 A | 10/2003 |

(Continued)

OTHER PUBLICATIONS

Machine translation of JP 03-126725 (no date).*
Extended Search Report issued by the European Patent Office in corresponding European Patent Application No. 13852696.7 dated May 23, 2016 (9 pages).
International Search Report (PCT/ISA/210) dated Feb. 4, 2014, by the Japanese Patent Office as the International Searching Authority for International Application No. PCT/JP2013/006663.

*Primary Examiner* — Michael J Feely
(74) *Attorney, Agent, or Firm* — Buchanan, Ingersoll & Rooney PC

(57) ABSTRACT

To provide: a semiaromatic polyamide which has excellent moldability, heat resistance, chemical resistance and mechanical characteristics; and a molded article of this semiaromatic polyamide. A semiaromatic polyamide (I) of the present invention contains 35-50% by mole of a structural unit derived from terephthalic acid [A], 25-40% by mole of a structural unit derived from isophthalic acid [B], 15-35% by mole of a structural unit derived from an aliphatic dicarboxylic acid [C] (provided that the total of [A], [B] and [C] is 100% by mole), and a structural unit derived from an aliphatic diamine [D] having 4-12 carbon atoms. The molar ratio ([A]/[B]) is from 65/35 to 50/50, and the molar ratio ([C]/[B]) is from 30/70 to 50/50. The melting enthalpy ([increment]H) of the semiaromatic polyamide (I) as determined by differential scanning calorimetry (DSC) is 20-40 mJ/mg, and the intrinsic viscosity of the semiaromatic polyamide (I) is 0.7-1.6 dl/g.

23 Claims, 1 Drawing Sheet

(56) References Cited

FOREIGN PATENT DOCUMENTS

| JP | 2004-203012 A | 7/2004 |
|---|---|---|
| JP | 2007-502728 A | 2/2007 |
| JP | 2010-121113 A | 6/2010 |
| JP | 2012-67150 A | 4/2012 |
| WO | WO 03/085029 A1 | 10/2003 |
| WO | WO 2006/056574 A1 | 6/2006 |

* cited by examiner

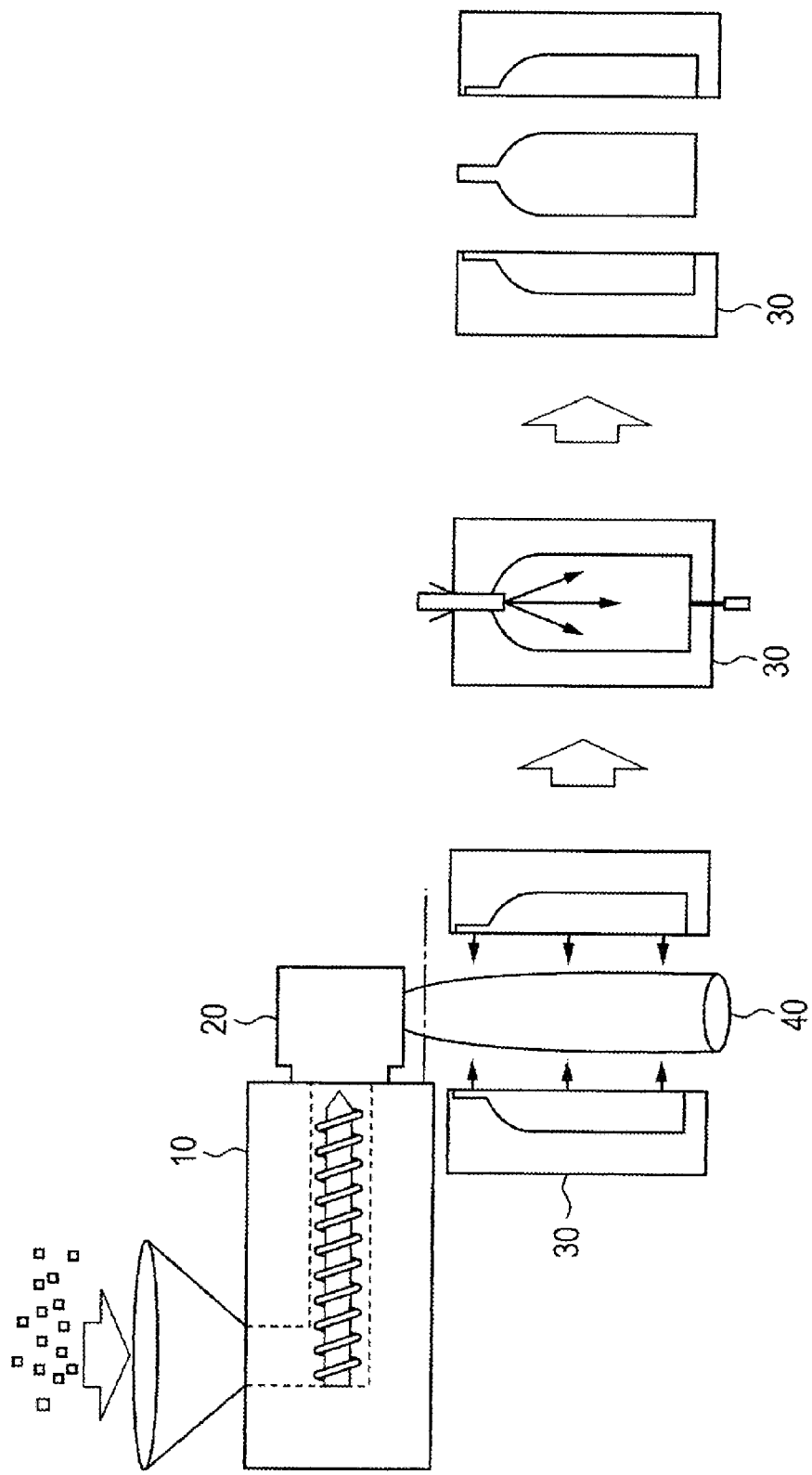

SEMIAROMATIC POLYAMIDE, SEMIAROMATIC POLYAMIDE RESIN COMPOSITION, AND MOLDED ARTICLE

TECHNICAL FIELD

The present invention relates to a semi-aromatic polyamide, a semi-aromatic polyamide resin composition and a molded article.

BACKGROUND ART

Polyamides typified by Nylon 6, Nylon 66 have been widely used as various component materials for clothes, industrial materials, automobiles, electric and electronics, engineering and other purposes for their excellent moldability, mechanical physical properties, and chemical resistance.

Recent demands for, for example, metal substitution for lighter components however, have led to increasing demands for further improvement in mechanical properties and functions such as fuel barrier resistance and coolant resistance in polyamide molded products. More specifically, conventional Nylon 6 and Nylon 66 are not sufficient in heat resistance, dimensional stability, mechanical properties, chemical resistance and other properties when used for fuel tubes, coolant hoses and air intake ducts for automobiles; therefore, the current situation is that they cannot be used in such applications.

In response to such demands, semi-aromatic polyamides have been proposed in order to solve such problems pertinent in conventional polyamides. As the semi-aromatic polyamides, for example, high melting point semi-aromatic polyamides including terephthalic acid and 1,6-hexanediamine as the main components (hereinafter simply referred to as "6T-based copolyamides" in some cases) have been proposed, with some of which being in practical use.

A polyamide consisting of terephthalic acid and 1,6-hexanediamine (hereinafter, simply referred to as "PA6T" in some cases) is a polymer having a melting point of as high as about 370° C. Therefore, when a molded article is to be obtained by melt-molding of PA6T, the polymer undergoes significant thermal degradation, and therefore, a molded article having sufficient properties cannot be easily obtained.

Thus, 6T-based copolyamides have been used which are obtained by copolymerization of PA6T with aliphatic polyamides such as Nylon 6 and Nylon 66 or with amorphous aromatic polyamides such as Nylon 6I to reduce the melting point to a level as low as about 220 to about 340° C. These 6T-based copolyamides do exhibit such properties as low water absorption property, high heat resistance and high chemical resistance, but exhibit low melt tension; therefore, the shape of their parison cannot be easily retained during extrusion molding or blow molding and drawdown easily occurs.

Thus, 6T-based copolyamides have been used which are formulated with large amounts of resin other than polyamide resins, such as polyphenylene ether resins, polyolefin resins or modified polyolefin resins for improved blow moldability (see, e.g., PTLs 1 and 2). However, due to the influence of the presence of large amounts of resins other than polyamides, these 6T-based copolymers have the drawback of reduced 6T-based copolymer's properties inherent in polyamide resins, such as mechanical strength, heat resistance, and chemical resistance.

On the other hand, 6T-based copolyamides not blended with other resins are hardly subjected to extrusion molding or blow molding.

Nylon 12, which has superior flexibility, is frequently used in fuel piping for automobiles. The transpiration regulation of fuel gas with respect to automobiles, however, has been increasingly severer in recent years, and various low-permeable fuel hoses have been studied that would meet the transpiration regulation.

While the fuel tubes have been conventionally made of fluororesin, such fuel tubes have attracted attention that are made of resin that is more inexpensive and more excellent in fuel low permeability than fluororesins, e.g., polyphenylenesulfide resin (PPS), aromatic polyamide resin such as polyamide 6T (PA6T) or polyamide 9T (PA9T), or polyester resin such as polybutylene terephthalate (PBT).

Various tubes provided with a fuel-low permeable layer made of such a resin have been proposed (see, e.g., PTLs 3 to 6). Nevertheless, the resins that are replacing fluororesins and attracting attention have high rigidity, poor flexibility, and low impact resistance particularly at low temperatures, and thus tubes made of these resins are easily cracked. On the other hand, piping for automobiles, such as fuel system piping and cooling system piping, is commonly produced by blow molding or extrusion molding. General polyamide resins have low melt tension and therefore the shape of their parison is cannot be easily retained during extrusion molding or blow molding and thus drawdown easily occurs. Therefore, almost no examples have been reported in which a polyamide resin not blended with other resins is subjected to extrusion molding or blow molding.

Polyamides typified by Nylon 6 and Nylon 66 are also used for basic engine components such as engine covers, connectors connected thereto and air intake manifold, and automobile components such as relay boxes, gears and clips. Meanwhile, recent reductions in the size of the engine room and increases in the engine performance and engine output have caused a rise in the temperature of the engine room and engine cooling water. Thus, resin products used in these applications have been increasingly required to have higher heat resistance, and there is a growing demand for polyamides that exhibit excellent heat resistance compared to Nylon 66.

As described above, crystalline polyamide resins typified by Nylon 6 and Nylon 66 generally have low melt viscosity, and therefore the shape of their parison cannot be easily retained during blow molding and drawdown easily occurs. Therefore, there are cases wherein measurement of the mass of parison and/or control of the thickness of a product is difficult. To avoid this problem, as disclosed in PTL2, a method is proposed wherein a crystalline polyamide resin is formulated with a modified olefin resin such as an ionomer resin. This method results in a slight increase in the melt viscosity and a decrease in thickness variation of a small blow-molded article. However, since a relatively long parison is used in advanced blow moldings in which products having a complicated shape or many inserting components are integrally molded, such as three dimensional blow molding, multidimensional extrusion blow molding and multilayer molding, drawdown easily occurs and a uniform product cannot be molded with this method. This method also has the drawbacks of reducing mechanical strength and chemical resistance of a molded article due to the addition of large amounts of olefins or ionomers.

To avoid this problem, a method has been proposed wherein a crystalline polyamide resin is formulated with glass fiber or the like to increase apparent melt viscosity (PTL 7). This method, however, has the drawback of instable melt viscosity, and drawdown easily occurs particularly in a large blow-molded article, and thickness variation is large in a blown product.

Another method has been proposed wherein a polyamide resin consisting of a decane terephthalamide unit and an undecaneamide unit is formulated with a reactivity modifier (glycidyl group-containing styrene-based polymer or carboxylic acid group-containing olefin-based polymer) and a fibrous reinforcing material with (PTL 8). With this method, however, it is difficult to control the reaction between the polyamide resin and the reactivity modifier, and thus local thickening may occur during the retention of resin resulting in thickness variation in a molded article. Moreover, a crosslinked gel may be formed that deteriorates the appearance of a molded article. Furthermore, this method has the serious drawback of reducing mechanical strength of a molded article due to incorporation of long-chain methylene moiety in the main chain for increased melt viscosity of the polyamide itself.

CITATION LIST

Patent Literature

PTL 1
Japanese Patent Application Laid-Open No. 05-339494
PTL 2
Japanese Patent Application Laid-Open No. 60-170664
PTL 3
Japanese Patent Application Laid-Open No. 10-138372
PTL 4
Japanese Patent Application Laid-Open No. 2003-287165
PTL 5
Japanese Unexamined Patent Application Publication (Translation of PCT Application) No. 2007-502728
PTL 6
Japanese Patent Application Laid-Open No. 2004-203012
PTL 7
Japanese Patent Publication No. 40-5233
PTL 8
Japanese Patent Application Laid-Open No. 2012-67150

SUMMARY OF INVENTION

Technical Problem

An object of the present invention is to provide a semi-aromatic polyamide obtained by polycondensation of terephthalic acid, isophthalic acid and an aliphatic dicarboxylic acid with an aliphatic diamine, the semi-aromatic polyamide having suitable moldability as various component materials for automobiles, electric and electronics, industrial materials, engineering materials, articles for daily use and household articles, and the like, and being excellent in heat resistance, chemical resistance and mechanical properties, as well as a molded article thereof.

Another object of the present invention is to provide a polyamide resin composition that has a high melt tension while having sufficiently high flexibility and barrier property as a constituent resin of a piping part for automobiles. Another object of the present invention is to provide a polyamide resin composition that has high toughness and sufficiently high heat resistance as a constituent resin of an engine peripheral part for automobiles, and that has a melt tension sufficient for exhibiting good blow moldability.

Solution to Problem

A first aspect of the present invention relates to semi-aromatic polyamides given below.

[1] A semi-aromatic polyamide (I) including a structural unit derived from terephthalic acid [A], a structural unit derived from isophthalic acid [B], a structural unit derived from $C_{4-10}$ aliphatic dicarboxylic acid [C], and a structural unit derived from $C_{4-12}$ aliphatic diamine [D], in which the semi-aromatic polyamide (I) includes 35 to 50 mol % of the structural unit derived from terephthalic acid [A], 25 to 40 mol % of the structural unit derived from isophthalic acid [B], and 15 to 35 mol % of the structural unit derived from aliphatic dicarboxylic acid [C] (provided that a sum of [A], [B] and [C] is 100 mol %), a molar ratio of the structural unit derived from terephthalic acid [A] to the structural unit derived from isophthalic acid [B] ([A]/[B]) is 65/35 to 50/50, a molar ratio of the structural unit derived from aliphatic dicarboxylic acid [C] to the structural unit derived from isophthalic acid [B] ([C]/[B]) is 30/70 to 50/50, and an amount of melting heat ($\Delta H$) of the semi-aromatic polyamide (I) obtained by differential scanning calorimetry (DSC) is 20 to 40 mJ/mg and an intrinsic viscosity [$\eta$] of the semi-aromatic polyamide (I) is 0.7 to 1.6 dl/g.

[2] The semi-aromatic polyamide (I) according to [1], in which aliphatic dicarboxylic acid [C] is adipic acid or sebacic acid.

[3] The semi-aromatic polyamide (I) according to [1] or [2], in which aliphatic diamine [D] is a $C_{6-9}$ linear diamine.

[4] The semi-aromatic polyamide (I) according to any one of [1] to [3], in which aliphatic diamine [D] is hexamethylenediamine.

[5] The semi-aromatic polyamide (I) according to any one of [1] to [4], in which a melting completion temperature (T) determined by differential scanning calorimetry (DSC) is 250 to 300° C.

[6] The semi-aromatic polyamide (I) according to any one of [1] to [5], in which a melt flow rate (T+10° C.) of the semi-aromatic polyamide at a melting completion temperature (T)+10 (° C.) as determined by differential scanning calorimetry (DSC) is 1 to 50 g/10 min., and a melt tension (T+10° C.) of the semi-aromatic polyamide at a melting completion temperature (T)+10 (° C.) as determined by differential scanning calorimetry (DSC) is 3 to 30 mN.

A second aspect of the present invention relates to semi-aromatic polyamide compositions given below.

[7] A semi-aromatic polyamide resin composition including 72 to 93 mass % of the semi-aromatic polyamide (I) according to any one of [1] to [5], and 7 to 28 mass % of olefin polymer (II)-a including 0.3 to 1.5 mass % of a functional structure unit (provided that a sum of (I) and (II)-a is 100 mass %).

[8] The semi-aromatic polyamide resin composition according to [7], in which a functional group of olefin polymer (II)-a is a functional group selected from carboxylic acid, ester, ether, aldehyde and ketone.

[9] The semi-aromatic polyamide resin composition according to [7] or [8], in which olefin polymer (II)-a includes a structural unit derived from maleic anhydride.

[10] A semi-aromatic polyamide resin composition including 35 to 72 mass % of the semi-aromatic polyamide (I) according to any one of [1] to [5], and 28 to 65 mass % of a mixture of olefin polymer (II)-a including 0.3 to 1.5 mass % of a functional structure unit and olefin polymer (II)-b including no functional structure unit, the mixture having a content of the functional structure unit of 0.15 to 0.50 mass % (provided that a sum of (I), (II)-a and (II)-b is 100 mass %).

A third aspect of the present invention relates to semi-aromatic polyamide compositions given below.

[11] A semi-aromatic polyamide resin composition including 50 to 80 mass % of the semi-aromatic polyamide (I) according to any one of [1] to [5], and 20 to 50 mass % of fibrous reinforcing material (III) (provided that a sum of (I) and (III) is 100 mass %).

[12] The semi-aromatic polyamide resin composition according to [11], in which the semi-aromatic polyamide resin composition further includes 0.3 to 1.5 parts by mass of glycidyl group-containing polymer (IV) including 5 to 30 mass % of a glycidyl group-containing structural unit, based on 100 parts by mass of the semi-aromatic polyamide resin composition, and a content (mass %) of the glycidyl group-containing structural unit of the semi-aromatic polyamide resin composition satisfies the following Expression A:

0.05<content (mass %) of glycidyl group-containing structural unit<0.18      (A).

[13] The semi-aromatic polyamide resin composition according to [12], in which the glycidyl group-containing structural unit of glycidyl group-containing polymer (IV) is a structural unit derived from glycidyl methacrylate.

[14] The semi-aromatic polyamide resin composition according to any one of [11] to [13], in which fibrous reinforcing material (III) is a glass fiber.

[15] The semi-aromatic polyamide resin composition according to any one of [11] to [13], further including heat resistant stabilizer (V).

[16] The semi-aromatic polyamide resin composition according to [15], in which heat resistant stabilizer (V) includes copper iodide and potassium iodide.

[17] A hollow body including semi-aromatic polyamide (I) according to any one of [1] to [5].

[18] A molded article including the semi-aromatic polyamide resin composition according to any one of [7] to [16].

[19] A molded article including the semi-aromatic polyamide resin composition according to any one of [11] to [16].

[20] An air intake/exhaust system component including the semi-aromatic polyamide resin composition according to any one of [11] to [16].

[21] An automobile cooling system component including the semi-aromatic polyamide resin composition according to any one of [11] to [16].

[22] A method for producing the semi-aromatic polyamide resin according to any one of [1] to [5], the method including feeding a mixture that includes a dicarboxylic acid component containing 35 to 50 mol % of terephthalic acid [A], 25 to 40 mol % of isophthalic acid [B] and 15 to 35 mol % of aliphatic dicarboxylic acid [C], a molar ratio of terephthalic acid [A] to isophthalic acid [B] ([A]/[B]) being 65/35 to 50/50 and a molar ratio of aliphatic dicarboxylic acid [C] to isophthalic acid [B] ([C]/[B]) being 30/70 to 50/50, a diamine component containing $C_{4-12}$ aliphatic diamine [D], and 0 to 90 mass % of water to a batch or continuous reactor to subject the mixture to polycondensation under pressure and heating under conditions of a pressure in the reactor of 0.5 to 4.0 MPa and a temperature of 150 to 260° C., providing a low-degree condensate, and subjecting the low-degree condensate to a high degree of polymerization by maintaining at a pressure of 0.5 to 4.0 MPa and heating to a temperature ranging from a melting point of a polyamide to be produced to the melting point+100° C., while removing water generated by polycondensation.

Advantageous Effects of Invention

The semi-aromatic polyamide of the present invention has low water absorption property as well as heat resistance and mechanical properties in a well-balanced manner, and is suitably applied to extrusion molding and blow molding. That is, the semi-aromatic polyamide of the present invention has high aromatic concentration, exhibits controlled crystallinity and heat resistance, and simultaneously has excellent physical properties and relatively high melt tension. Therefore, a composition including the semi-aromatic polyamide of the present invention is easily applied to various molding procedures such as extrusion molding and blow molding, and can be molded into a pipe, for example.

BRIEF DESCRIPTION OF DRAWINGS

FIG. 1 is a diagram illustrating an outline of a molding machine that performs blow molding.

DESCRIPTION OF EMBODIMENTS

1. Semi-Aromatic Polyamide (I)

Semi-aromatic polyamide (I) includes a structural unit derived from terephthalic acid [A], a structural unit derived from isophthalic acid [B], a structural unit derived from $C_{4-10}$ aliphatic dicarboxylic acid [C], and a structural unit derived from $C_{4-12}$ aliphatic diamine [D].

Semi-aromatic polyamide (I) includes at least the structural unit derived from terephthalic acid [A], the structural unit derived from isophthalic acid [B], and the structural unit derived from $C_{4-10}$ aliphatic dicarboxylic acid [C] as structural units derived from a dicarboxylic acid.

Structural Unit Derived from Terephthalic Acid [A]

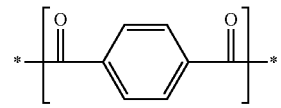

Structural Unit Derived from Isophthalic Acid [B]

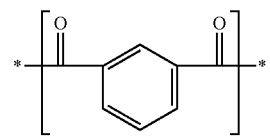

Examples of $C_{4-10}$ aliphatic dicarboxylic acid [C] include linear aliphatic dicarboxylic acids such as adipic acid ($C_6$), suberic acid ($C_8$), azelaic acid ($C_9$) and sebacic acid ($C_{10}$). Aliphatic dicarboxylic acid [C] is particularly preferably adipic acid or sebacic acid from the perspective of costs and mechanical properties.

When the sum of the structural unit derived from [A], the structural unit derived from isophthalic acid [B] and the structural unit derived from [C] included in semi-aromatic polyamide (I) is assumed to be 100 mol %, the content of the structural unit derived from [A] is 35 to 50 mol %, the content of the structural unit derived from [B] is 25 to 40 mol % (preferably 30 to 40 mol %), and the content of the structural unit derived from [C] is 15 to 35 mol % (preferably 20 to 30 mol %).

Semi-aromatic polyamide (I) may also have a structural unit derived from a dicarboxylic acid other than dicarboxylic acids [A] to [C] (structural unit derived from other carboxylic acid). The number of moles of other structural units derived from a dicarboxylic acid is preferably 5% or less based on the total number of moles of structural units [A] to [C]. Examples of other dicarboxylic acids include aromatic dicarboxylic acids such as 2-methylterephthalic acid and naphthalenedicarboxylic acid, furandicarboxylic acids such as 2,5-furandicarboxylic acid, alicyclic dicarboxylic acids such as 1,4-cyclohexanedicarboxylic acid and 1,3-cyclohexanedicarboxylic acid, and aliphatic dicarboxylic acids having 11 or more carbon atoms.

Semi-aromatic polyamide (I) includes at least the structural unit derived from $C_{4-12}$ aliphatic diamine [D] as a structural unit derived from diamine. Aliphatic diamine [D] may be a straight aliphatic diamine or a linear aliphatic diamine having a side chain. Examples of aliphatic diamine [D] include straight aliphatic diamines such as 1,4-diaminobutane, 1,6-diaminohexane, 1,7-diaminoheptane, 1,8-diaminooctane, 1,9-diaminononane, 1,10-diaminodecane, 1,11-diaminoundecane and 1,12-diaminododecane; and linear aliphatic diamines having a side chain, such as 2-methyl-1,5-diaminopentane, 2-methyl-1,6-diaminohexane, 2-methyl-1,7-diaminoheptane, 2-methyl-1,8-diaminooctane, 2-methyl-1,9-diaminononane, 2-methyl-1,10-diaminodecane and 2-methyl-1,11-diaminoundecane.

Aliphatic diamine [D] is preferably a $C_{6-9}$ diamine, more preferably hexamethylenediamine ($C_6$) or nonanediamine ($C_9$).

Semi-aromatic polyamide (I) may have a structural unit derived from a diamine other than aliphatic diamine [D], and the number of moles of such a structural unit is preferably 10% or less based on the number of moles of [D]. Examples of other diamines include aromatic diamines such as m-xylenediamine, and alicyclic diamines such as 1,4-cyclohexanediamine and 1,3-cyclohexanediamine.

The total content of the structural units derived from [A] to [D] included in semi-aromatic polyamide (I) is preferably 50 mass % or more, more preferably 70 mass % or more, further preferably 90 mass % or more relative to semi-aromatic polyamide (I). When the total content of the structural units derived from [A] to [D] is in the above range, a polyamide resin that exerts the effects of the present invention can be easily provided.

The melt tension at the "melting completion temperature (T)+10 (° C.)" of semi-aromatic polyamide (I) is preferably 3 to 30 mN, more preferably 5 to 25 mN. The melt tension of the semi-aromatic polyamide of the present invention is measured using "CAPIROGRAPH 1B" manufactured by Toyo Seiki Seisaku-Sho, Ltd. at a capillary diameter of 1.0 mmφ, a capillary length of 20 mm, a winding speed of 10 m/min, and the melting completion temperature (T)+10° C. When the melt tension (mN) falls within the above range, the shape of parison can be more easily retained during extrusion molding or blow molding of the aromatic polyamide resin composition of the present invention, so that drawdown does not easily occur. The measurement method of the melting completion temperature (T) is described later.

The melt tension of semi-aromatic polyamide (I) can be adjusted mainly by the molecular weight and the ratios of the structural units derived from [A] to [C] included in the semi-aromatic polyamide.

In semi-aromatic polyamide (I), the molar ratio of the structural unit derived from [A] to the structural unit derived from [B] ([A]/[B]) is preferably 65/35 to 50/50. While terephthalic acid [A] imparts crystallinity to the semi-aromatic polyamide to increase heat resistance, it hardly increases the melt tension of the semi-aromatic polyamide. On the other hand, it is considered that isophthalic acid [B] can increase the melt tension of the semi-aromatic polyamide while maintaining the heat resistance of the semi-aromatic polyamide.

In semi-aromatic polyamide (I), the molar ratio of the structural unit derived from [C] to the structural unit derived from [B] ([C]/[B]) is preferably 30/70 to 50/50. While aliphatic dicarboxylic acid [C] can impart non-crystallinity to the semi-aromatic polyamide (decrease the melting completion temperature (T)) to improve moldability and/or other properties, it does not easily increase the melt tension of the semi-aromatic polyamide. On the other hand, it is considered that isophthalic acid [B] can increase the melt tension of the semi-aromatic polyamide while maintaining the heat resistance of the semi-aromatic polyamide.

The present invention has been made based on the that the melt tension of the semi-aromatic polyamide can be increased by setting the ratios of the structural units derived from [A] to [C] to fall within specific ranges. For example, PA6T (polyamide obtained from terephthalic acid and hexamethylenediamine) and PA66 (polyamide obtained from adipic acid and hexamethylenediamine) are also known to be low in melt tension. Both PA6T and PA66 are presumed to be relatively low in tension in melting because they have, as constituents, dicarboxylic acid and diamine having a high linearity and therefore are high in rigidity and result in less entanglement of polymer chains.

By contrast, semi-aromatic polyamide (I) of the present invention contains the structural units derived from [A] to [C] at ratios that fall within specific ranges, and it is considered that the tension in melting is increased particularly by properly setting the molar ratio ([A]/[B]) and the molar ratio ([C]/[B]). That is, isophthalic acid [B] rather has a curved structure than linearity. It is therefore considered that polymer chains of the semi-aromatic polyamide have a reduced rigidity and are easily entangled. As a result, the tension in melting of the semi-aromatic polyamide is presumed to be increased.

The intrinsic viscosity [η] of semi-aromatic polyamide (I) is 0.7 to 1.6 dl/g, preferably 0.8 to 1.2 dl/g. The intrinsic viscosity [η] is measured at a temperature of 25° C. in 96.5% sulfuric acid. When the intrinsic viscosity [η] falls within the above range, the fluidity the resin composition during molding can be increased and mechanical properties of the resulting molded product are also enhanced. When the intrinsic viscosity [η] of semi-aromatic polyamide (I) is too low, it is likely that the melt tension of the polyamide resin composition of the present invention becomes lower than a desired range.

When the intrinsic viscosity is 0.7 dl/g or more, a molded product having sufficient mechanical strength and melt tension can be obtained. When the intrinsic viscosity is 1.6 dl/g or less, a polyamide well-balanced between the intrinsic viscosity and the fluidity during molding is obtained. In order to adjust the intrinsic viscosity [η] of the semi-aromatic polyamide to fall within the above range, for example, a molecular weight modifier or the like is preferably formulated in the reaction system to cause a reaction between the dicarboxylic acids and the diamine. A monocarboxylic acid and a monoamine can be used as the molecular weight modifier.

Examples of the monocarboxylic acid for use as the molecular weight modifier can include $C_{2-30}$ aliphatic monocarboxylic acids, aromatic monocarboxylic acids and alicyclic monocarboxylic acids. Herein, the aromatic monocarboxylic acids and alicyclic monocarboxylic acids may have a substituent in a cyclic moiety. Examples of the aliphatic monocarboxylic acids can include acetic acid, propionic acid, butyric acid, valeric acid, caproic acid, caprylic acid, lauric acid, tridecylic acid, myristic acid, palmitic acid, stearic acid, oleic acid and linoleic acid. Examples of the aromatic monocarboxylic acids can include benzoic acid, toluic acid, naphthalenecarboxylic acid, methylnaphthalenecarboxylic acid and phenylacetic acid, and examples of the alicyclic monocarboxylic acids can include cyclohexanecarboxylic acid.

The molecular weight modifier is added to the reaction system in which the dicarboxylic acids and the diamine are reacted to provide a polyamide, and is usually preferably added in an amount of 0 to 0.07 mol, preferably 0 to 0.05 mol based on 1 mol of the total amount of the dicarboxylic acids. When the molecular weight modifier is used in such an amount, at least some molecules of the molecular weight modifier are incorporated into the polyamide to thereby adjust the molecular weight of the polyamide, namely, the intrinsic viscosity [η], to fall within a desired range.

The melting point (Tm) of semi-aromatic polyamide (I) determined by differential scanning calorimetry (DSC) is preferably 230° C. or higher. A semi-aromatic polyamide sample is heated, once retained at 320° C. for 5 minutes, then cooled to 23° C. at a rate of 10° C./min., and thereafter heated at a rate of 10° C./min, by using DSC7 manufactured by PerkinElmer, Inc. The endothermic peak due to melting here may be defined as the melting point (Tm) of the polyamide. Herein, the temperature corresponding to the peak top of the endothermic peak observed by differential scanning calorimetry is not distinct in some cases.

The amount of melting heat (ΔH) of semi-aromatic polyamide (I) is 20 to 40 mJ/mg, preferably 20 to 35 mJ/mg. The amount of melting heat serves as a measure of the crystallinity of the polyamide, and it is suggested that the crystallinity is higher as the amount of melting heat is larger, and the crystallinity is lower as the amount of melting heat is smaller. While the semi-aromatic polyamide of the present invention contains the structural unit derived from terephthalic acid [A] to have a certain crystallinity, the semi-aromatic polyamide preferably includes the structural units derived from dicarboxylic acids [A] to [C] that are arranged as randomly as possible. If the structural units derived from dicarboxylic acids [A] to [C] are not randomly arranged and the structural unit derived from terephthalic acid [A] is arranged as a block, the crystallinity of the semi-aromatic polyamide is excessively higher and as a result, the amount of melting heat (ΔH) is more than 40 mJ/mg.

The melting completion temperature (T) of semi-aromatic polyamide (I) determined by differential scanning calorimetry (DSC) is preferably 250 to 300° C. The melting completion temperature (T) refers to the temperature at which endotherm due to melting is not observed in the same differential scanning calorimetry as in the measurement of the melting point. Specifically, the melting completion temperature (T) refers to the temperature at which the endothermic peak observed by differential scanning calorimetry returns to the baseline.

The melting completion temperature (T) of semi-aromatic polyamide (I) is characterized by being relatively low. That is, the semi-aromatic polyamide of the present invention is completely molten at a relatively low temperature. In order to decrease the melting completion temperature (T), the structural units derived from [A] to [C] in the semi-aromatic polyamide are preferably arranged as randomly as possible.

The melt flow rate (T+10° C., 2.16 kg) of semi-aromatic polyamide (I) is preferably 1 to 50 g/10 min. The melt flow rate of the semi-aromatic polyamide of the present invention can be measured according to ASTM D1238 procedure B.

Semi-aromatic polyamide (I) can be produced based on a production method known as a conventional method for producing a semi-aromatic polyamide. For example, semi-aromatic polyamide (I) can be produced by polycondensation of dicarboxylic acids [A] to [C] and diamine [D] in a homogenous solution. More specifically, semi-aromatic polyamide (I) can be produced by polycondensation in which the dicarboxylic acids and diamine are heated in the presence of a catalyst to provide a low-degree condensate, and then shear stress is applied to a molten product of the low-degree condensate, as described in WO03/085029.

Semi-aromatic polyamide (I) can also be produced through a first step of subjecting a mixture including dicarboxylic acids [A] to [C] and diamine [D] described above and 0 to 90 mass % of water to polycondensation under pressure and heating to provide a low-degree condensate; and a second step of subjecting the resulting low-degree condensate to high polymerization under pressure and heating to a desired degree of polymerization while removing water generated by polycondensation.

In the first step, the mixture including dicarboxylic acids [A] to [C] and diamine [D] described above and 0 to 90 mass % of water is loaded into a batch or continuous reactor. The amount of water here is preferably 0 to 90 mass %, more preferably 4 to 80 mass % based on the total amount of the raw materials and water loaded. Then, the raw materials loaded are heated to 150 to 260° C. in the reactor, and subjected to polycondensation under pressure and heating under a condition of a pressure in the reactor of 0.5 MPa to 4.0 MPa to provide a low-degree condensate.

In the second step, the low-degree condensate is subjected to a high degree of polymerization to an intended degree of polymerization by holding the pressure state and heating to a temperature of the melting point of a polyamide to be produced or higher, while water generated by polycondensation is removed. The pressure at which the pressure state is retained is preferably 0.5 MPa to 4.0 MPa. A pressure of less than 0.5 MPa is not preferable because the diamine component is easily volatilized outside the polymerization system. On the other hand, a pressure of more than 4.0 MPa is not preferable because excessive heat history is loaded. The maximum temperature of the polymerization reactor system is required to range from the melting point of the polyamide to the melting point+100° C., preferably from the melting point of the polyamide to the melting point+60° C.

2. Semi-Aromatic Polyamide Resin Composition

The semi-aromatic polyamide resin composition of the present invention includes semi-aromatic polyamide (I) of the present invention; and can further include if necessary other resins (for example, olefin-based polymer (II)), a reinforcing material, and/or the like. A preferable example of the semi-aromatic polyamide resin composition of the present invention includes the first and second semi-aromatic polyamide resin compositions described below.

2-1. First Semi-Aromatic Polyamide Resin Composition

The first semi-aromatic polyamide resin composition of the present invention preferably includes semi-aromatic polyamide (I) and olefin polymer (II). Examples of the first semi-aromatic polyamide resin composition of the present invention include first semi-aromatic polyamide resin composition A and first semi-aromatic polyamide resin composition B.

Semi-aromatic polyamide resin (I) is preferably semi-aromatic polyamide (I) of the present invention. As described later, from the viewpoint of imparting sufficient flexibility and barrier property to a molded article, the content of semi-aromatic polyamide (I) in first semi-aromatic polyamide resin composition A of the present invention is preferably 72 to 93 mass %, more preferably 80 to 90 mass % when the sum of semi-aromatic polyamide (I) and olefin polymer (II)-a is assumed to be 100 mass %. On the other hand, from the viewpoint of imparting further flexibility and impact resistance to a molded article without impairing excellent heat resistance and strength of semi-aromatic polyamide (I), the content of semi-aromatic polyamide (I) in first semi-aromatic polyamide resin composition B of the present invention is preferably 35 to 72 mass %, more preferably 40 to 70 mass % when the sum of semi-aromatic polyamide (I), olefin polymer (II)-a and olefin polymer (II)-b is assumed to be 100 mass %.

Olefin Polymer (II)

Olefin polymer (II) may be olefin polymer (II)-a including a functional structure unit, olefin polymer (II)-b including no functional structure unit, or a mixture thereof.

In particular, from the viewpoint of imparting sufficient flexibility and barrier property to a molded article, first semi-aromatic polyamide resin composition A of the present invention preferably includes olefin polymer (II)-a including a functional structure unit. Olefin polymer (II)-a including a functional structure unit can not only enhance the melt tension of the resin composition, but also impart flexibility to a molded article.

Olefin polymer (II)-a including a functional structure unit includes 0.3 to 1.5 mass % of a functional structure unit based on 100 mass % of olefin polymer (II)-a. Such a functional group is preferably a functional group including a hetero atom, more specifically preferably a functional group including carbon, hydrogen and oxygen. Specific examples of the functional group include carboxylic acid group (including carboxylic anhydride group), ester group, ether group, aldehyde group, and ketone group.

Examples of the olefin polymer backbone moiety of olefin polymer (II)-a include known polymer backbones of an ethylene-based polymer, a propylene-based polymer, a butene-based polymer and copolymers of such olefins. A particularly preferable olefin polymer backbone is a backbone of a copolymer of ethylene and an olefin having 3 or more carbon atoms.

Olefin polymer (II)-a can be obtained by, for example, subjecting an unmodified olefin polymer and a compound having a corresponding functional group to a modification reaction in a specific proportion. One preferable example of the unmodified olefin polymer is an ethylene/α-olefin copolymer.

The ethylene/α-olefin copolymer is a copolymer of ethylene with another olefin, for example, a $C_{3-10}$ α-olefin such as propylene, 1-butene, 1-hexene, 4-methyl-1-pentene, 1-octene or 1-decene. Specific examples of the ethylene/α-olefin copolymer include an ethylene/propylene copolymer, an ethylene/1-butene copolymer, an ethylene/1-hexene copolymer, an ethylene/1-octene copolymer and an ethylene/4-methyl-1-pentene copolymer. Among them, an ethylene/propylene copolymer, an ethylene/1-butene copolymer, an ethylene/1-hexene copolymer and an ethylene/1-octene copolymer are preferable.

The ethylene/α-olefin copolymer preferably includes 70 to 99.5 mol %, preferably 80 to 99 mol % of a structural unit derived from ethylene, and includes 0.5 to 30 mol %, preferably 1 to 20 mol % of a structural unit derived from α-olefin.

The ethylene/α-olefin copolymer desirably has a melt flow rate (MFR) at 190° C. under a load of 2.16 kg according to ASTM D1238, of 0.01 to 20 g/10 min., preferably 0.05 to 20 g/10 min.

The method for producing the ethylene/α-olefin copolymer is not particularly limited, and the ethylene/α-olefin copolymer can be prepared by a known method using, for example, a transition metal catalyst such as titanium (Ti), vanadium (V), chromium (Cr), or zirconium (Zr). More specific examples can include a method in which the ethylene/α-olefin copolymer is produced by copolymerizing ethylene and one or more $C_{3-10}$ α-olefins in the presence of a Ziegler catalyst or metallocene catalyst made of a V compound and an organic aluminum compound. In particular, a production method using a metallocene catalyst is suitable.

Particularly preferable examples of the compound having a functional group for modification reaction of the unmodified olefin polymer include unsaturated carboxylic acids or derivatives thereof. Specific examples of the unsaturated carboxylic acids or derivatives thereof include unsaturated carboxylic acids such as acrylic acid, methacrylic acid, α-ethylacrylic acid, maleic acid, fumaric acid, itaconic acid, citraconic acid, tetrahydrophthalic acid, methyltetrahydrophthalic acid and endo cis-bicyclo[2,2,1]hepto-5-ene-2,3-dicarboxylic acid (Nadic acid [trademark]), and derivatives of these acids, such as halides, amides, imides, anhydrides and esters of these acids. Among them, an unsaturated dicarboxylic acid or an anhydride of such an acid is suitable, and maleic acid, Nadic acid (trademark) or an anhydride of such an acid is particularly suitable.

A particularly preferable compound having a functional group can include maleic anhydride. Maleic anhydride is relatively highly reactive with the unmodified olefin polymer, is not easily polymerized with maleic anhydride, for example, and tends to be stable as a basic structure. Therefore, maleic anhydride has various advantages, such as capability of providing olefin polymer (II)-a having a stable quality.

One exemplary method for obtaining olefin polymer (II)-a using the above ethylene/α-olefin copolymer involves subjecting the ethylene/α-olefin copolymer to so-called graft modification with a compound containing a functional group corresponding to the functional structure unit.

The ethylene/α-olefin copolymer can be subjected to graft modification by known methods. Examples of the graft-modification method can include a method in which the ethylene/α-olefin copolymer is dissolved in an organic solvent, an unsaturated carboxylic acid or a derivative thereof, a radical initiator and the like are added to the resulting solution, and the resultant is subjected to reaction at a temperature of usually 60 to 350° C., preferably 80 to 190° C., for 0.5 to 15 hours, preferably 1 to 10 hours.

The organic solvent that dissolves the ethylene/α-olefin copolymer is not particularly limited, and includes aromatic hydrocarbon solvents such as benzene, toluene and xylene; and aliphatic hydrocarbon solvents such as pentane, hexane and heptane.

Another graft-modification method of the ethylene/α-olefin copolymer includes a method in which the ethylene/α-olefin copolymer and an unsaturated carboxylic acid or a derivative thereof are reacted preferably in the absence of solvent in an extruder or the like. The reaction conditions in this case is as follows: the reaction temperature can be usually equal to or higher than the melting point of the ethylene/α-olefin copolymer, specifically 100 to 350° C., and the reaction time can be usually 0.5 to 10 minutes.

In order to subject the ethylene/α-olefin copolymer and the compound having a functional group such as an unsaturated carboxylic acid group, to effective graft modification reaction, modification reaction is preferably performed in the presence of a radical initiator. Examples of the radical initiator include organic peroxides and organic peresters, such as benzoyl peroxide, dichlorobenzoyl peroxide, dicumyl peroxide, di-t-butyl peroxide, 2,5-dimethyl-2,5-di(peroxidebenzoate)hexyne-3,1,4-bis(t-butylperoxyisopropyl)benzene, lauroyl peroxide, t-butyl peracetate, 2,5-dimethyl-2,5-di(t-butylperoxy)hexyne-3,2,5-dimethyl-2,5-di(t-butylperoxy)hexane, t-butyl perbenzoate, t-butyl perphenylacetate, t-butyl perisobutyrate, t-butyl per-sec-octoate, t-butyl perpivalate, cumyl perpivalate and t-butyl perdiethylacetate; and azo compounds such as azobisisobutyronitrile and dimethyl azoisobutyrate. Among them, preferable are dialkyl peroxides such as dicumyl peroxide, di-t-butyl peroxide, 2,5-dimethyl-2,5-di(t-butylperoxy)hexyne-3,2,5-dimethyl-2,5-di(t-butylperoxy)hexane and 1,4-bis(t-butylperoxyisopropyl)benzene. The radical initiator is usually used in a proportion of 0.001 to 1 part by weight based on 100 parts by weight of an unmodified ethylene/α-olefin copolymer.

A modified ethylene/α-olefin copolymer, a preferable mode of olefin polymer (II)-a, preferably has a density of 0.80 to 0.95 g/cm$^3$, more preferably 0.85 to 0.90 g/cm$^3$.

The intrinsic viscosity [η] of the modified ethylene/α-olefin copolymer, measured at 135° C. in a decalin (decahydronaphthalene) solution, is preferably 0.5 to 4.0 dl/g, more preferably 1.0 to 3 dl/g, further preferably 1.5 to 3 dl/g. When the [η] falls within the above range, the toughness and the melting fluidity of the resin composition of the present invention can be simultaneously achieved at a high level.

The intrinsic viscosity [η] of olefin polymer (II)-a at 135° C. in decalin is measured in the following manner according to a usual method. 20 mg of sample is dissolved in 15 ml of decalin, and the specific viscosity (ηsp) is measured using an Ubbelohde viscometer in an atmosphere of 135° C. After 5 ml of decalin is further added to this decalin solution for dilution, the same specific viscosity measurement is performed. Such dilution operation and viscosity measurement are repeated twice to provide the measurement results, the concentration (:C) is extrapolated to zero based on the results to provide an "ηsp/C" value, and the "ηsp/C" value is defined as the intrinsic viscosity [η].

The content of the functional structure unit included in olefin polymer (II)-a is 0.3 to 1.5 mass %, preferably 0.4 to 1.1 mass %. If the content of the functional structure unit is too low, the heat resistance, mechanical characteristics and impact resistance of the resin composition may be poor. The reason for this would be because the interaction between olefin polymer (II)-a and semi-aromatic polyamide (I) is weak, olefin polymer (II)-a cannot be easily dispersed in the resin composition sufficiently, and a molded article having sufficient heat resistance, mechanical characteristics and impact resistance cannot be easily obtained. On the other hand, if the content of the functional structure unit is too high, the interaction between olefin polymer (II)-a and semi-aromatic polyamide (I) is strong, and the melt viscosity of the resin composition may be so high as to result in reduction in moldability. The resin may undergo gelation or decomposition due to generation of heat during production or molding of the resin composition.

The content of the functional structure unit included in olefin polymer (II)-a can be specified by the ratio of the unmodified olefin polymer to the compound having a functional group loaded in reaction, or known means such as $^{13}$C-NMR measurement or $^{1}$H-NMR measurement. Specific NMR measurement conditions can be, for example, the following conditions.

In the case of $^{1}$H-NMR measurement, conditions are as follows: apparatus: ECX400 nuclear magnetic resonance spectrometer manufactured by JEOL Ltd.; solvent: deuterated orthodichlorobenzene; sample concentration: 20 mg/0.6 mL; measurement temperature: 120° C.; observation nucleus: 1H (400 MHz); sequence: single pulse; pulse width: 5.12 μsec (45° pulse); repeating time: 7.0 sec.; and cumulative number: 500 or more. While the standard chemical shift is defined by setting the peak from hydrogen of tetramethylsilane at 0 ppm, the standard chemical shift can also be defined for example by setting the peak from the remaining hydrogen of deuterated orthodichlorobenzene at 7.10 ppm to provide the same result. The peak of 1H or the like derived from the functional group-containing compound can be assigned by a usual method.

In the case of $^{13}$C-NMR measurement, conditions are as follows: measurement apparatus: ECP500 nuclear magnetic resonance spectrometer manufactured by JEOL Ltd.; solvent: mixed solvent of orthodichlorobenzene/deuterated benzene (80/20 vol %); measurement temperature: 120° C.; observation nucleus: 13C (125 MHz); single pulse proton decoupling; 45° pulse; repeating time: 5.5 sec.; cumulative number: 10,000 or more; and standard chemical shift: 27.50 ppm. Various signals are assigned based on an ordinary method, and can be quantitatively determined based on the integrated values of the signal intensities.

The content of the functional structure unit included in olefin polymer (II)-a may also be simply measured by the following procedure. The content of the functional group of each of polymers having a different functional group content is determined by NMR measurement, and each polymer whose functional group content is determined is subjected to infrared spectroscopy (IR) measurement. The calibration curve of the intensity ratio of specific peaks in the infrared spectroscopic (IR) spectrum and the functional group content is created. The calibration curve is used to determine the functional group content of any polymer. While this method is a simple method as compared with the above NMR measurement, the respective calibration curves are basically required to be created according to the types of a base resin and the functional group. For this reason, the above method is preferably used for process managements and the like in resin production in a commercial plant.

The content of olefin polymer (II)-a in first polyamide resin composition A is preferably 7 to 28 mass %, more preferably 10 to 20 mass % when the sum of semi-aromatic polyamide (I) and olefin polymer (II)-a is assumed to be 100 mass %. If the content of olefin polymer (II)-a is too low, the melt tension may be lower, and if the content is too high, fuel may be easily permeated.

In order to further impart flexibility and impact resistance to a molded article without impairing excellent heat resistance and strength of semi-aromatic polyamide (I), first semi-aromatic polyamide resin composition B preferably includes a mixture of olefin polymer (II)-a including a functional structure unit and olefin polymer (II)-b including no functional structure unit. When olefin polymer (II)-b including no functional structure unit is further contained in the presence of olefin polymer (II)-a including a functional structure unit, not only the melt tension of the resin composition can be enhanced, but also the flexibility and impact strength of a molded article can be further enhanced.

Olefin polymer (II)-b including no functional structure unit can be defined in the same manner as the above unmodified olefin polymer. That is, olefin polymer (II)-b including no functional structure unit may be an olefin homopolymer or copolymer, and is preferably a copolymer of ethylene and an α-olefin having 3 or more carbon atoms.

The total content of olefin polymer (II)-a including a functional structure unit and olefin polymer (II)-b including no functional structure unit in first semi-aromatic polyamide resin composition B is preferably 28 to 65 mass %, more preferably 30 to 60 mass %, when the sum of semi-aromatic polyamide (I), olefin polymer (II)-a including a functional structure unit and olefin polymer (II)-b including no functional structure unit is assumed to be 100 mass %.

The content ratio of olefin polymer (II)-a including a functional structure unit to olefin polymer (II)-b including no functional structure unit is preferably 80:20 to 20:80, more preferably 70:30 to 20:80 on the mass basis.

The average content of the functional structure unit of the mixture of olefin polymer (II)-a including a functional structure unit and olefin polymer (II)-b including no functional structure unit is preferably 0.15 to 0.50 mass %, further preferably 0.15 to 0.30 mass %. When the content rate of olefin polymer (II)-a including a functional structure unit is too low, it is not preferable because the dispersibility of olefin polymer (II)-a including a functional structure unit and olefin polymer (II)-b including no functional structure unit in first semi-aromatic polyamide resin composition B may be reduced resulting in poor heat resistance, mechanical characteristics and impact resistance of the semi-aromatic polyamide resin composition. On the other hand, when the content rate of olefin polymer (II)-a including a functional structure unit is too high, it is not preferable because the viscosity of the semi-aromatic polyamide resin composition may become so high as to result in poor moldability or to cause gelation or decomposition of resin due to generation of heat during production or molding.

The average content of the functional structure unit (mass %) of the mixture can be calculated as "content of functional structure unit in olefin polymer (H)-a"/"total amount of olefin polymer (II)-a and olefin polymer (II)-b"×100 (mass %). The "content of functional structure unit in olefin polymer (II)-a" is found as the mass of olefin polymer (II-a×the content of the functional structure unit (mass %).

The first semi-aromatic polyamide resin composition may further contain optional additives, together with semi-aromatic polyamide (I) and olefin polymer (II), depending on the applications as long as the effects of the present invention are not impaired. Examples of the optional additives that can be added include various known compounding agents such as antioxidants (phenols, amines, sulfurs, phosphoruses and the like), fillers (clay, silica, alumina, talc, kaolin, quartz, mica, graphite and the like), heat resistant stabilizers (lactone compounds, vitamin E, hydroquinones, copper halide, iodine compounds and the like), light stabilizers (benzotriazoles, triazines, benzophenones, benzoates, hindered amines, oxanilides and the like), other polymers (polyolefins, olefin copolymers such as an ethylene/propylene copolymer and an ethylene/1-butene copolymer, olefin copolymers such as a propylene/1-butene copolymer, polystyrene, polyamide, polycarbonate, polyacetal, polysulfone, polyphenyleneoxide, fluororesins, silicone resins, LCP and the like), flame retardants (bromine, chlorine, phosphorus, antimony and inorganic flame retardants, and the like), fluorescent brightening agents, plasticizers, thickeners, antistatic agents, release agents, pigments and crystal nucleating agents.

The content of the optional additives in the first semi-aromatic polyamide resin composition of the present invention can be used in a proportion of, although it depends on the type thereof, preferably 0 to 10 mass %, more preferably 0 to 5 mass %, further preferably 0 to 1 mass % when the sum of semi-aromatic polyamide (I) and olefin polymer (II) is assumed to be 100 mass %.

Physical Properties

The melt tension of first semi-aromatic polyamide resin composition A of the present invention is preferably 20 to 90 mN, more preferably 30 to 70 mN. The melt tension of first semi-aromatic polyamide resin composition A means the melt tension at the "melting completion temperature (T)+10 (° C.)" of semi-aromatic polyamide (I) included in first semi-aromatic polyamide resin composition A. The melt tension of first semi-aromatic polyamide resin composition A of the present invention is measured at a capillary diameter of 1.0 mmφ, a capillary length of 20 mm, a winding speed of 10 m/min. and the melting completion temperature (T)+10° C. using "CAPIROGRAPH 1B" manufactured by Toyo Seiki Seisaku-Sho, Ltd.

The melt flow rate of first semi-aromatic polyamide resin composition A of the present invention is preferably 0.1 to 20 g/10 min. The melt flow rate of first semi-aromatic polyamide resin composition A means the melt flow rate under a load of 5 kg at the "melting completion temperature (T)+10 (° C.)" (T+10° C., 5 kg) of semi-aromatic polyamide (I) in first semi-aromatic polyamide resin composition A. The melt flow rate of the first semi-aromatic polyamide resin composition of the present invention can be measured according to ASTM D1238 procedure B.

The bending elastic modulus of first semi-aromatic polyamide resin composition A of the present invention is preferably 400 to 2,100 MPa, more preferably 800 to 2,000 MPa, from the viewpoint of imparting high flexibility and barrier property to a molded article. The bending strength of first semi-aromatic polyamide resin composition A of the present invention is preferably 40 to 200 MPa, more preferably 60 to 150 MPa.

The bending elastic modulus and bending strength of first semi-aromatic polyamide resin composition A of the present invention respectively refer to the bending elastic modulus and bending strength of a test piece (64 mm in length, 6 mm in width and 0.8 mm in thickness) molded using an injection molding machine under the following conditions.

Molding machine: Tuparl TR40S3A, Sodick Plustech Co., Ltd.

Cylinder temperature of molding machine: melting completion temperature (T)+10° C., mold temperature: 40° C.

The test piece molded is left to stand at a temperature of 23° C. under a nitrogen atmosphere for 24 hours, and thereafter treated in an oven at 150° C. for 2 hours. Then, the bending test is performed under an atmosphere of a temperature of 23° C. and a relative humidity of 50% by a bending tester AB5 manufactured by NTESCO at a span of 26 mm and a bending speed of 5 mm/min., to measure the bending elastic modulus and strength.

The melt tension of first semi-aromatic polyamide resin composition B of the present invention is preferably 30 to 90 mN, more preferably 30 to 70 mN. The melt tension of first semi-aromatic polyamide resin composition B means the melt tension at the "melting completion temperature (T)+10 (° C.)" of semi-aromatic polyamide (I) included in first semi-aromatic polyamide resin composition B. The melt tension of first semi-aromatic polyamide resin composition B of the present invention is measured at a capillary diameter of 1.0 mmφ, a capillary length of 20 mm, a winding speed of 3 m/min. and the melting completion temperature (T)+10° C. using "CAPIROGRAPH 1B" manufactured by Toyo Seiki Seisaku-Sho, Ltd.

The melt flow rate of first semi-aromatic polyamide resin composition B of the present invention is preferably 1.0 to 20 g/10 min. The melt flow rate of first semi-aromatic polyamide resin composition B of the present invention means the melt flow rate under a load of 10 kg at the "melting completion temperature (T)+10 (° C.)" (T+10° C., 10 kg) of semi-aromatic polyamide (I) in first semi-aromatic polyamide resin composition B. The melt flow rate of first semi-aromatic polyamide resin composition B of the present invention can be measured according to ASTM D1238 procedure B.

The bending elastic modulus of first semi-aromatic polyamide resin composition B of the present invention is preferably 50 to 1,700 MPa, from the viewpoint of further imparting flexibility to a molded article. The bending strength of first semi-aromatic polyamide resin composition B of the present invention is preferably 20 to 150 MPa.

The IZOD impact strength of first semi-aromatic polyamide resin composition B of the present invention is preferably 300 to 1,500 J/m. The TZOD impact strength of first semi-aromatic polyamide resin composition B of the present invention can be measured by the following method. That is, the following injection molding machine is used to produce a notched test piece having a thickness of 3.2 mm adjusted under the following molding conditions. The test piece molded is left to stand at a temperature of 23° C. under a nitrogen atmosphere for 24 hours, and thereafter treated in an oven at 150° C. for 2 hours. This test piece is used to measure the IZOD impact strength under an atmosphere of a temperature of 23° C. and a relative humidity of 50% according to ASTM D256.

Molding machine: SE50DU manufactured by Sumitomo Heavy Industries, Ltd.
Cylinder temperature of molding machine: (melting completion temperature (T)+10)° C., mold temperature: 40° C.

The deflection temperature under load of first semi-aromatic polyamide resin composition B of the present invention is preferably 85 to 110° C. The deflection temperature under load of first semi-aromatic polyamide resin composition B of the present invention can be measured by the following method. That is, a test piece is produced in the same manner as in the above IZOD impact strength, and heat-treated. This test piece is used for measurement according to ASTM D648, and the temperature is measured at which the deflection under load reaches 0.254 mm with the test piece being loaded with a bending stress of 1.82 MPa and heated at a rate of 2° C./min.

The first semi-aromatic polyamide resin composition of the present invention can be produced by methods wherein the components including semi-aromatic polyamide (I) and olefin polymer (II) are mixed by any of the means known in the art, such as HENSCHEL MIXER, V blender, ribbon blender, and tumbler blender, or methods wherein after such mixing further melt-kneading the components by a uniaxial extruder, multiaxial extruder, kneader, Banbury mixer or the like followed by granulation or pulverization.

2-2. Second Semi-aromatic Polyamide Resin Composition

A second semi-aromatic polyamide resin composition of the present invention preferably includes semi-aromatic polyamide (I) of the present invention, and fibrous reinforcing material (III).

Semi-aromatic polyamide resin (I) is preferably semi-aromatic polyamide (I) of the present invention. The content of semi-aromatic polyamide resin (I) in the second semi-aromatic polyamide resin composition of the present invention is preferably 50 to 80 mass % when the sum of component (I) and component (III) is assumed to be 100 mass %.

Fibrous Reinforcing Material (III)

Fibrous reinforcing material (III) is for most effectively improving physical properties such as strength, rigidity and heat resistance, and specific examples thereof include fibers such as glass fiber, carbon fiber, aramid fiber, alumina fiber, silicon carbide fiber and zirconia fiber, whiskers of aluminum borate, potassium titanate and the like, and needle-like wollastonite and milled fiber, but are not limited thereto. In particular, glass fiber, carbon fiber or the like is advantageously used.

Fibrous reinforcing material (III) is preferably treated with a coupling agent such as an organic silane compound, an organic titanium compound, an organic borane compound and an epoxy compound in advance, and particularly preferably a fibrous reinforcing material that is easily reactive with a carboxylic acid group and/or carboxylic anhydride group. A polyamide resin composition including glass fiber treated with the coupling agent is preferable because a molded article excellent in mechanical properties and appearance properties is obtained. Other fibrous reinforcing materials, if not treated with the coupling agent, can be used after addition of the coupling agent.

The glass fiber that can be advantageously used is chopped strand glass fiber that is cut so as to have a fiber length of about 1 to 20 mm. The cross-sectional shape of the glass fiber can be circular or non-circular, but is preferably non-circular from the viewpoint that good physical properties are achieved.

The non-circular cross-sectional glass fiber includes substantially ellipsoidal, substantially oblong and substantially cocoon fibers with respect to the cross section perpendicular to the longitudinal direction of fiber, and preferably has a degree of flatness of 1.5 to 8. The degree of flatness refers to the ratio of longer axis/shorter axis where a rectangle having the smallest area circumscribed to the cross section perpendicular to the longitudinal direction of the glass fiber is assumed, and the length of a longer side and that of a shorter side of the rectangle are defined as a longer axis and a shorter axis, respectively.

The size of the glass fiber is not particularly limited, and preferably the shorter axis is about 1 to 20 μm and the longer axis is about 2 to 100 μm.

The content of fibrous reinforcing material (III) in the second polyamide resin composition may be appropriately selected, and is preferably 20 to 50 mass %, more preferably 25 to 45 mass %, further preferably 30 to 40 mass % when the sum of component (I) and component (III) is assumed to be 100 mass %. If the content of fibrous reinforcing material (III) is more than 50 mass %, fluidity is remarkably reduced and thus the semi-aromatic polyamide resin composition cannot be subjected to molding in some cases. In addition, elongation in melting is not observed and perforation occurs during air blowing in some cases. On the other hand, if the content of fibrous reinforcing material (III) is less than 20 mass %, the effect of the reinforcing material cannot be sufficiently exerted and the melt flow rate may be higher causing not to impart good blow moldability in some cases.

Glycidyl Group-Containing Polymer (IV)

The second semi-aromatic polyamide resin composition preferably further includes glycidyl group-containing polymer (IV), because no scuffing occurs in a molded article even for a long retention time during blow molding. The "glycidyl group-containing polymer" refers to a polymer including a glycidyl group-containing structural unit. The content of the glycidyl group-containing structural unit is preferably 5 to 30 mass % relative to glycidyl group-containing polymer (IV).

Examples of glycidyl group-containing polymer (IV) include glycidyl group-containing styrene-based copolymer (B). Glycidyl group-containing styrene-based copolymer (B) can be a copolymer obtained by polymerization of a monomer mixture of a glycidyl group-containing acrylic monomer and a styrene-based monomer; or a copolymer obtained by polymerization of a monomer mixture including a glycidyl group-containing acrylic monomer, a styrene-based monomer and another vinyl monomer.

Examples of the glycidyl group-containing acrylic monomer include glycidyl (meth)acrylate, (meth)acrylates having a cyclohexene oxide structure, and (meth)acryl glycidyl ether. A preferable glycidyl group-containing acrylic monomer is glycidyl (meth)acrylate having a high reactivity.

Examples of the styrene-based monomer include styrene and α-methylstyrene. The glycidyl group-containing structural unit is preferably a structural unit derived from glycidyl methacrylate.

Examples of another vinyl monomer include (meth) acrylic acid alkyl esters, (meth)acrylic acid polyalkylene glycol esters, (meth)acrylic acid alkoxyalkyl esters, (meth) acrylic acid hydroxyalkyl esters, (meth)acrylic acid dialkylaminoalkyl esters, (meth)acrylic acid benzyl esters, (meth) acrylic acid phenoxyalkyl esters, (meth)acrylic acid isobornyl esters and (meth)acrylic acid alkoxysilylalkyl esters, each having a $C_{1-22}$ alkyl group (alkyl group may be straight or branched), such as methyl (meth)acrylate, ethyl (meth)acrylate, propyl (meth)acrylate, butyl (meth)acrylate, 2-ethylhexyl (meth)acrylate, cyclohexyl (meth)acrylate, stearyl (meth)acrylate and methoxyethyl (meth)acrylate. Vinyl esters such as (meth)acrylamide, (meth)acryldialkylamide and vinyl acetate, vinyl ethers, aromatic vinyl monomers such as (meth)aryl ether, and α-olefin monomers such as ethylene and propylene can also be used. These can be appropriately selected and used singly or in combinations of two or more.

Specific examples of glycidyl group-containing styrene-based copolymer (B) include styrene/glycidyl (meth)acrylate, styrene/glycidyl (meth)acrylate/methyl (meth)acrylate and styrene/glycidyl (meth)acrylate/butyl (meth)acrylate copolymers, but are not limited thereto.

The contents of the styrene-based polymer unit, the glycidyl group-containing acrylic polymer unit and another vinyl polymer unit in glycidyl group-containing styrene-based copolymer (B) is, respectively, preferably 95 to 50 mass %, 5 to 30 mass % and 0 to 40 mass %; more preferably 95 to 50 mass %, 5 to 20 mass % and 0 to 40 mass %; further preferably 93 to 60 mass %, 7 to 15 mass % and 0 to 30 mass %.

If the content of the styrene-based polymer unit is less than 50 mass %, the miscibility between glycidyl group-containing styrene-based copolymer (B) and semi-aromatic polyamide (I) is poor, gelation tends to easily occur, and the rigidity of the composition may be reduced. If the content of the glycidyl group-containing acrylic polymer unit is more than 30 mass %, gelation of a resin composition including glycidyl group-containing styrene-based copolymer (B) easily occurs.

The weight average molecular weight of glycidyl group-containing styrene-based copolymer (B) is preferably 500 to 20,000, more preferably 700 to 10,000, further preferably 1,000 to 10,000. If the weight average molecular weight is less than 500, an unreacted reaction group-containing acrylic copolymer may bleed out on the surface of a molded article to cause the surface of a molded article to be contaminated. On the other hand, if the weight average molecular weight is more than 20,000, the compatibility with semi-aromatic polyamide (I) may be reduced to cause phase separation, gelation and the like, adversely affecting the appearance of a molded article.

The content of glycidyl group-containing polymer (IV) (preferably glycidyl group-containing styrene-based copolymer (B)) in the second polyamide resin composition is preferably 0.3 to 1.5 parts by mass, more preferably 0.5 to 1.5 parts by mass based on 100 parts by mass of the semi-aromatic polyamide resin composition. The optimal content of glycidyl group-containing styrene-based copolymer (B) varies depending on the content of the glycidyl group-containing structural unit. For example, if the content of the glycidyl group-containing structural unit is high, the content of glycidyl group-containing styrene-based copolymer (B) may be low; and if the content of the glycidyl group-containing structural unit is low, the content of glycidyl group-containing styrene-based copolymer (B) is required to be high. In the case of glycidyl group-containing styrene-based copolymer (B) in which the content of the glycidyl group-containing structural unit is in the above range, if the content of glycidyl group-containing styrene-based copolymer (B) is less than 0.3 parts by mass, the thickening effect may be low; and if the content is more than 1.5 parts by mass, gelation or the like may partially occur to adversely affect appearance and moldability of a molded article, and a sufficient reaction may not progress within a short time in an extruder and the residual glycidyl group may undergo reaction in the molding machine to result in a change in viscosity resulting in instable molding performance.

The content (mass %) of the glycidyl group-containing structural unit in the second semi-aromatic polyamide resin composition of the present invention preferably satisfies the following Expression A.

$$0.05 < \text{Content (mass \%) of glycidyl group-containing structural unit} < 0.18 \quad (A)$$

Content (mass %) of glycidyl group-containing structural unit=a [Mass % of glycidyl group structural unit in 100mass % of glycidyl group-containing polymer (IV)]×b [Mass % of glycidyl group-containing polymer (IV) based on 100mass % of semi-aromatic polyamide resin composition]/100

If the content of the glycidyl group-containing structural unit is less than 0.05, the reactivity thereof with semi-aromatic polyamide (I) may be low to cause the thickening effect to be insufficient. On the other hand, if the content is more than 0.18, gelation or the like may occur to adversely affect appearance and moldability of a molded article.

Heat Resistant Stabilizer (V)

The second semi-aromatic polyamide resin composition of the present invention preferably further includes heat resistant stabilizer (V), because a semi-aromatic polyamide resin composition is obtained which is excellent in fluidity, toughness, low water absorption property and strength rigidity, and also is excellent in heat resistance and heat aging resistance for a long time while characteristics of a polyamide, such as excellent heat resistance, fluidity, toughness, low water absorption property and rigidity are not impaired.

Examples of heat resistant stabilizer (V) include copper compounds such as copper halide, copper acetate, copper propionate, copper benzoate, copper adipate, copper terephthalate, copper isophthalate, copper salicylate, copper nicotinate and copper stearate, and copper complex salts coordinated with a chelating agent such as ethylenediamine and ethylenediamine tetraacetic acid. These copper compounds may be used singly or in combinations of two or more.

As such a copper compound, preferable are copper iodide, copper(I) bromide, copper(II) bromide, copper(I) chloride and copper acetate, more preferable are copper iodide and/or copper acetate because of being excellent in heat aging resistance for a long time, and being capable of suppressing metal corrosion of screw and cylinder portions in extrusion (hereinafter sometimes abbreviated as "metal corrosion").

As heat resistant stabilizer (V), a metal halide (provided that copper halide is excluded) may also be used. The metal halide is a salt of a Group 1 or 2 metal element in the periodic table with halogen, examples include potassium iodide, potassium bromide, potassium chloride, sodium iodide and sodium chloride, and potassium iodide and potassium bromide are preferable. The metal halide may be used singly or in combinations of two or more. The metal halide is preferably potassium iodide because of being excellent in heat aging resistance for a long time and being capable of suppressing metal corrosion.

Heat resistant stabilizer (V) particularly preferably includes the copper compound and the metal halide, because a semi-aromatic polyamide resin composition is obtained which is excellent in fluidity, toughness, low water absorption property and strength rigidity, and also is excellent in heat resistance and heat aging resistance for a long time while characteristics of a polyamide are not impaired. Heat resistant stabilizer (V) as a preferable combination may be a combination of copper iodide and potassium iodide.

The content of heat resistant stabilizer (V) in the second polyamide resin composition is preferably 0.1 to 1.0 part by mass based on 100 parts by mass of semi-aromatic polyamide (I). The content of the copper compound in the semi-aromatic polyamide resin composition including the copper compound and the metal halide as heat resistant stabilizer (V) is preferably 0.01 to 0.6 parts by mass, more preferably 0.02 to 0.4 parts by mass based on 100 parts by mass of semi-aromatic polyamide (I). The content of the copper compound can be in the above range to result in an enhancement in heat aging resistance for a sufficiently long time, suppressing precipitation of copper and metal corrosion.

The content of the copper compound preferably ranges from 50 to 2,000 parts by mass, more preferably from 100 to 1,500 parts by mass, further preferably from 150 to 1,000 parts by mass in terms of copper based on $10^6$ parts by mass of the semi-aromatic polyamide. The semi-aromatic polyamide composition can include the copper compound and the metal halide in an amount of 50 to 2,000 parts by mass in terms of copper, thus providing a semi-aromatic polyamide composition excellent in heat aging resistance for a long time.

The content of the metal halide in the semi-aromatic polyamide composition including the copper compound and the metal halide as heat resistant stabilizer (V) is preferably 0.05 to 20 parts by mass, more preferably 0.2 to 10 parts by mass based on 100 parts by mass of semi-aromatic polyamide (I). The content of the metal halide can be in the above range to result in an enhancement in heat aging resistance for a sufficiently long time, suppressing precipitation of copper and metal corrosion.

With respect to the ratio of the copper compound and the metal halide, the molar ratio of halogen to copper (halogen/copper) is preferably 2/1 to 50/1, more preferably 2/1 to 40/1, further preferably 5/1 to 30/1. A molar ratio of halogen to copper of 2/1 or more is preferable because precipitation of copper and metal corrosion can be suppressed. In addition, a molar ratio of halogen to copper of 50/1 or less can suppress the problem of corrosion of a screw or the like in a molding machine while mechanical physical properties such as toughness and strength rigidity are not impaired.

The copper compound and the metal halide can be each formulated alone in order for the above-described effects to be exerted. In order to enhance performances of the resulting semi-aromatic polyamide resin composition, the semi-aromatic polyamide resin composition preferably includes both the copper compound and the metal halide as heat resistant stabilizer (V).

The second semi-aromatic polyamide resin composition may further contain optional additives, together with semi-aromatic polyamide (I) and fibrous reinforcing material (III), depending on the applications as long as the effects of the present invention are not impaired. As the optional additives, those described above can be used.

The content of the optional additives in the second semi-aromatic polyamide resin composition is, although it depends on the type thereof, preferably 0 to 10 mass %, more preferably 0 to 5 mass %, further preferably 0 to 1 mass % when the sum of semi-aromatic polyamide (I) and fibrous reinforcing material (III) is assumed to be 100 mass %.

The melt flow rate of the second semi-aromatic polyamide resin composition is preferably 0.1 to 20 g/10 min. The melt flow rate of the second semi-aromatic polyamide resin composition means the melt flow rate under a load of 10 kg at the "melting completion temperature (T)+10 (° C.)" (T+10° C., 10 kg) of semi-aromatic polyamide (I) in the second semi-aromatic polyamide resin composition. The melt flow rate of the second semi-aromatic polyamide resin composition can be measured according to ASTM D1238 procedure B.

The bending elastic modulus of the second semi-aromatic polyamide resin composition is preferably 5,000 to 15,000 MPa, more preferably 6,000 to 13,000 MPa. The bending strength of the second semi-aromatic polyamide resin composition is preferably 100 to 300 MPa, more preferably 150 to 250 MPa.

The bending elastic modulus and bending strength of the second semi-aromatic polyamide resin composition refer to the bending elastic modulus and bending strength of a test piece (64 mm in length, 6 mm in width and 0.8 mm in thickness) molded using an injection molding machine under the following conditions.
Molding machine: Tuparl TR40S3A, Sodick Plustech Co., Ltd.
Cylinder temperature of molding machine: melting completion temperature (T)+10° C., mold temperature: 40° C.

The test piece molded is left to stand at a temperature of 23° C. under a nitrogen atmosphere for 24 hours, and thereafter treated in an oven at 150° C. for 2 hours. Then, the bending test is performed under an atmosphere of a temperature of 23° C. and a relative humidity of 50% by a bending tester AB5 manufactured by NTESCO at a span of 26 mm and a bending speed of 5 mm/min, to measure the bending elastic modulus and strength.

The second semi-aromatic polyamide resin composition can be produced as described above by methods wherein the components including semi-aromatic polyamide (I) and fibrous reinforcing material (III) are mixed by any of the means known in the art, such as HENSCHEL MIXER, V blender, ribbon blender, and tumbler blender, or methods wherein after such mixing further melt-kneading the components by a uniaxial extruder, multiaxial extruder, kneader, Banbury mixer or the like followed by granulation or pulverization.

For example, the second semi-aromatic polyamide resin composition, when being produced using a biaxial extruder of a screw diameter of 30 mm and L/D=36, can be prepared by melt-polymerization at a resin feed rate of about 6 Kg/h at a barrel setting temperature of 330° C. and at a screw rotation speed of 200 rpm. The resin feed rate is preferably 2 Kg/h to 12 Kg/h. If the resin feed rate is less than the lower limit, the semi-aromatic polyamide resin composition may be difficult to prepare. On the other hand, if the resin feed rate is more than the upper limit, the intrinsic viscosity is less than 0.7 dl/g and moldability of the semi-aromatic polyamide resin composition may be reduced.

3. Molding Method and Applications

The semi-aromatic polyamide of the present invention and the semi-aromatic polyamide resin composition of the present invention can be molded by a well-known molding method such as press molding, injection molding, gas-assisted injection molding, welding molding, extrusion molding, blow molding, film molding, hollow molding, multilayer molding and melt spinning.

The semi-aromatic polyamide of the present invention and the semi-aromatic polyamide resin composition of the present invention can be preferably molded by blow molding among the foregoing molding methods. Blow molding is suitable for molding a hollow resin member such as a vessel or a pipe. Blow molding is performed by a molding machine (see FIG. 1) provided with melt extruder 10, die 20 including a double cylindrical die, and mold 30.

Blow molding can be performed by the following steps.

1) A resin is molten by melt extruder 10. 2) The molten resin is extruded from double cylindrical die 20 to provide a cylindrical molten resin body called parison 40. 3) Parison 40 is sandwiched by mold 30, and compressed air is blown into parison 40 to expand parison 40, bringing parison 40 into contact with the inner surface of mold 30. 4) A resin molded product is taken out from mold 30.

One disadvantage of blow molding is that thickness variation easily occurs in a molded product. Thickness variation occurs because, when parison is to be obtained, the parison is stretched by its own weight (this phenomenon is referred to as drawdown) resulting failure to maintain a predetermined shape. Accordingly, the melt tension of the resin may be increased in order to suppress thickness variation.

As described above, the melt tension of the semi-aromatic polyamide of the present invention is characterized by being relatively high (for example, the melt tension at the melting completion temperature ((T)+10 (° C.)) is 3 to 80 mN). Accordingly, a high-quality molded product is obtained in which thickness variation is small even after blow molding. By contrast, for their low melt tension, conventional polyamides such as PA6T (polyamide obtained from terephthalic acid and hexamethylenediamine) and PA66 (polyamide obtained from adipic acid and hexamethylenediamine) cannot easily provide a high-quality blow-molded article (hollow member).

The semi-aromatic polyamide of the present invention further simultaneously has characteristics as an aromatic polyamide, such as heat resistance, dimensional stability, mechanical properties, chemical resistance and barrier property. Accordingly, the semi-aromatic polyamide of the present invention and the resin composition including the same are also useful as a resin material of a hollow body such as a pipe (e.g., fuel pipe for automobiles) and a tank (e.g., fuel tank for automobiles) provided in machinery such as automobiles. This hollow body preferably has a structure having at least two layers, in which an inner layer thereof includes semi-aromatic polyamide (I) of the present invention.

The first semi-aromatic polyamide resin composition of the present invention can be advantageously molded into a pipe for automobiles because such a molded article has good flexibility and barrier property. The pipe for automobiles can be used in various piping applications for automobiles. Examples of a pipe for which properties of the semi-aromatic polyamide resin composition of the present invention can be effectively utilized include not only cooling system piping for automobiles which tends to be used under a high temperature environment, and fuel system piping demanded to have gasoline barrier property, but also oil system piping for use in transportation of various oils such as engine oil, brake oil and power steering oil, and air-conditioning system piping.

The shape of the pipe for automobiles can be appropriately set depending on the intended use, and for example, a pipe shape can be adopted in which the outer diameter ranges from 4 to 40 mm and the inner diameter ranges from 3 to 39 mm. The pipe wall of piping for automobiles in the present invention may have a straight shape with no wavy areas, or have a wavy area. The wavy area may be formed over the entire length of the piping for automobiles, or formed partially on any area of the piping. The wavy area refers to an area formed into a wavy shape, a bellows shape, an accordion shape, a corrugated shape or the like. Such a wavy area is formed to result in enhancements in impact absorption property and attachment property. The piping for automobiles in the present invention can also be formed into an L shape, a U shape or the like by, for example, adding a necessary part such as a connector, or bending processing.

The pipe for automobiles may have a monolayer structure including the first semi-aromatic polyamide resin composition of the present invention, or may have a laminated structure in which a layer including the polyamide resin composition and a layer including other types of materials are laminated.

Examples of other types of materials can include polyolefin-based resins, polyester-based resins, polyether-based resins, polysulfone-based resins, polythioether-based resins, polyketone-based resins, polynitrile-based resins, polymethacrylate-based resins, polyvinyl acetate resins, polyvinyl chloride resins, cellulose-based resins, fluororesins, polycarbonate-based resins, thermoplastic polyurethane resins, and polyamide-based resins. Among them, polyolefin-based resins, polyester-based resins, polythioether-based resins, fluororesins and polyamide-based resins are advantageously used.

The pipe for automobiles having a laminated structure can have layer (A) including the first semi-aromatic polyamide resin composition of the present invention, and outer layer (B) including a resin composition mainly including a polyolefin-based resin or an aliphatic polyamide resin. The pipe preferably further has inner layer (C) including a fluororesin on the inner periphery of layer (A). A pipe for automobiles having such a laminated structure is particularly preferable as a pipe for fuel.

Layer (A) preferably includes the first semi-aromatic polyamide resin composition of the present invention and preferably has a thickness of 0.02 mm to 1.0 mm.

Outer layer (B) preferably mainly includes a polyolefin-based resin or an aliphatic polyamide resin and preferably has a thickness of 0.03 to 1.5 mm. Examples of the polyolefin-based resin include high-density polyethylene (HDPE), low-density polyethylene (LDPE), polypropylene, polybutene, polymethylpentene, α-polyolefins and modified polyolefins (e.g., maleic anhydride- or epoxy-modified polyethylene). These resins are used singly or in combinations of two or more. Among them, HDPE is preferably used in view of high-temperature sealability. Examples of the aliphatic polyamide resin include polyamide 46 (PA46), polyamide 6 (PA6), polyamide 66 (PA66), polyamide 99 (PA99), polyamide 610 (PA610), polyamide 612 (PA612), polyamide 11 (PA11), polyamide 912 (PA912), polyamide 12 (PA12), a copolymer (PA6/66) of polyamide 6 and polyamide 66, and a copolymer (PA6/12) of polyamide 6 and polyamide 12. These resins are used singly or in combinations of two or more.

Inner layer (C) preferably includes a fluororesin and preferably has a thickness of 0.03 to 0.5 mm Examples of the fluororesin include polyvinyl fluoride (PVF), polyvinylidene fluoride (PVDF), polychlorotrifluoroethylene (CTFE), polytetrafluoroethylene (PTFE), copolymers such as a tetrafluoroethylene/hexafluoro copolymer (FEP), a tetrafluoroethylene/perfluoroalkylvinylether copolymer (PFA), a tetrafluoroethylene/hexafluoropropylene/vinylidene fluoride copolymer (THV), a copolymer of ethylene and tetrafluoroethylene (ETFE) and a copolymer of ethylene and polychlorotrifluoroethylene (ECTFE), and modified copolymers thereof, as well as various graft polymers and blended products. A conductive fluororesin or the like may be adopted which is obtained by adding to such a polymer carbon black, carbon fiber, carbon nanotube, a conductive polymer or the like to impart conductivity to the polymer. These are used singly or in combinations of two or more.

First semi-aromatic polyamide resin composition B of the present invention can be suitably used as a hollow body used in a liquid or gas atmosphere, for automobiles or industrials, because of having excellent heat resistance, chemical resistance and low water absorption property as a semi-aromatic polyamide, and having flexibility and an excellent impact resistance. First semi-aromatic polyamide resin composition B can also be suitably used as an interior material for automobiles because of having deep drawing moldability and flexible texture, and being excellent in heat resistance.

The molded article including the second semi-aromatic polyamide composition of the present invention is excellent in toughness, moldability and low water absorption property, and is also excellent in heat resistance and heat aging resistance for a long time. Accordingly, the molded article including the second semi-aromatic polyamide composition of the present invention can be used as an automobile cooling system component or an automobile air intake system component.

The automobile cooling system component is not particularly limited, and includes radiator tank components, and water pump components such as a coolant reserve tank, a water inlet pipe, a water outlet pipe, a water pump housing, a water pump impeller and a water valve.

The automobile air intake/exhaust system component is not particularly limited, and examples thereof include an air hose, an air duct, a turbo duct, a turbo hose, intake manifold or exhaust manifold, and an engine head cover.

EXAMPLES

Hereinafter, the present invention is further described with reference to Examples and Comparative Examples. The technical scope of the present invention is not construed to be limited by these Examples.

1. Synthesis of Polyamide

Example 1

An autoclave having an internal volume of 13.6 L was charged with 1,906 g (11.5 mol) of terephthalic acid, 2,800 g (24.1 mol) of 1,6-hexanediamine, 1,271 g (7.6 mol) of isophthalic acid, 699 g (4.8 mol) of adipic acid, 36.5 g (0.3 mol) of benzoic acid, 5.7 g (0.08 wt % relative to raw materials) of sodium hypophosphite-hydrate and 545 g of distilled water, and was purged with nitrogen. Stirring was started at 190° C., and the internal temperature was raised to 250° C. over 3 hours. The internal pressure of the autoclave here was increased to 3.03 MPa. After the reaction was continued in this state for 1 hour, the autoclave was opened to the atmosphere through a spray nozzle disposed at the bottom thereof, and a low-degree condensate was taken out. Thereafter, the low-degree condensate was cooled to room temperature, then pulverized by a pulverizer so as to have a particle size of 1.5 mm or less, and dried at 110° C. for 24 hours. The water content and the intrinsic viscosity [η] of the resulting low-degree condensate were 4,100 ppm and 0.15 dl/g, respectively. Then, this low-degree condensate was placed in a plate type solid phase polymerization apparatus, which was purged with nitrogen, and thereafter the temperature was raised to 180° C. over about 1 hour and 30 minutes. Thereafter, the reaction was performed for 1 hour and 30 minutes, and the temperature was decreased to room temperature. The intrinsic viscosity [η] of the resulting polyamide was 0.20 dl/g. Thereafter, melt-polymerization was performed at a barrel setting temperature of 330° C., a screw rotation speed of 200 rpm and a resin feed rate of 6 Kg/h by a biaxial extruder of a screw diameter of 30 mm and L/D=36, to prepare polyamide resin (PA1). Physical properties of the resulting polyamide resin are shown in Table 1.

Example 2

Polyamide resin (PA2) was prepared in the same manner as in Example 1 except that the amounts of terephthalic acid and isophthalic acid were changed. Physical properties of the resulting polyamide resin are shown in Table 1.

Example 3

Polyamide resin (PA3) was prepared in the same manner as in Example 1 except that the amounts of terephthalic acid and isophthalic acid were changed. Physical properties of the resulting polyamide resin are shown in Table 1.

Example 4

Polyamide resin (PA4) was prepared in the same manner as in Example 1 except that the amounts of terephthalic acid, isophthalic acid and adipic acid were changed. Physical properties of the resulting polyamide resin are shown in Table 1.

Example 5

Polyamide resin (PA5) was prepared in the same manner as in Example 4 except that the amounts of terephthalic acid and isophthalic acid were changed and the resin feed rate during melt-polymerization was changed to 10 Kg/h. Physical properties of the resulting polyamide resin are shown in Table 1.

Example 6

Polyamide resin (PA6) was prepared in the same manner as in Example 1 except that adipic acid was changed to sebacic acid. Physical properties of the resulting polyamide resin are shown in Table 1.

Example 7

An autoclave having an internal volume of 3 L was charged with 312 g (1.88 mol) of terephthalic acid, 500 g (4.30 mol) of 1,6-hexanediamine, 255 g (1.54 mol) of isophthalic acid, 125 g (0.85 mol) of adipic acid, 6.5 g (0.1 mol) of benzoic acid, 1.01 g (0.08 wt % relative to raw materials) of sodium hypophosphite-hydrate and 50 g of distilled water, and purged with nitrogen. Stirring was started at 50° C., and the internal temperature was raised to 150° C. over 3 hours. The internal pressure of the autoclave here was increased to 0.5 MPa. After the reaction was continued in this state for 1 hour, the pressure was kept at 0.5 MPa and the internal temperature was raised to 310° C., and water generated by polymerization was distilled off. Thereafter, the pressure in the autoclave was lowered to atmospheric pressure, and a polymer was taken out from the bottom of the autoclave under nitrogen pressure and cooled by cooling water to provide a pellet (polyamide resin PA11). The intrinsic viscosity [η] of the resulting polymer was 1.05 dl/g.

Comparative Example 1

Polyamide resin (PA7) was prepared in the same manner as in Example 1 except that the amounts of terephthalic acid and isophthalic acid were changed. Physical properties of the resulting polyamide resin are shown in Table 1.

Comparative Example 2

Polyamide resin (PA8) was prepared in the same manner as in Example 1 except that the amounts of terephthalic acid and isophthalic acid were changed. Physical properties of the resulting polyamide resin are shown in Table 1.

Comparative Example 3

Polyamide resin (PA9) was prepared in the same manner as in Example 4 except that the amounts of terephthalic acid, isophthalic acid and adipic acid were changed. Physical properties of the resulting polyamide resin are shown in Table 1.

Comparative Example 4

Polyamide resin (PA10) was prepared in the same manner as in Example 2 except that the resin feed rate during melt-polymerization was changed to 14 Kg/h. Physical properties of the resulting polyamide resin are shown in Table 1.

Physical properties of the polyamides obtained in Examples and Comparative Examples were measured or evaluated as follows. The measurement results and evaluation results are shown in Table 1.

Intrinsic viscosity [η]: 0.5 g of each polyamide was dissolved in 50 ml of a 96.5% sulfuric acid solution. The efflux time for the resulting solution under a condition of 25° C.±0.05° C. was measured using an Ubbelohde viscometer, and the intrinsic viscosity [η] was calculated based on "equation: $[\eta]=\eta SP/[C(1+0.205 \eta SP)]$".

[η]: intrinsic viscosity (dl/g)

ηSP: specific viscosity

C: concentration of sample (g/dl)

t: efflux time of sample solution (sec)

t0: efflux time of sulfuric acid as blank (sec)

$\eta SP=(t-t0)/t0$

Melting completion temperature (T): each polyamide was retained at 320° C. for 5 minutes once, then cooled to 23° C. at a rate of 10° C./min., and thereafter heated at a rate of 10° C./min., by using DSC7 manufactured by PerkinElmer, Inc. The temperature, at which the endothermic peak due to melting disappeared, in this case was defined as the melting completion temperature (T).

Amount of melting heat: each polyamide was retained at 320° C. for 5 minutes once, then cooled to 23° C. at a rate of 10° C./min., and thereafter heated at a rate of 10° C./min., by using DSC7 manufactured by PerkinElmer, Inc. The amount of melting heat was calculated from the integrated value of the endothermic peak due to melting in this case.

Melt flow rate: the MFR of each polyamide was measured according to ASTM D1238 procedure B under conditions of the melting completion temperature (T)+10° C. and a load of 2.16 kg.

Melt tension: the melt tension (mN) was measured using "CAPIROGRAPH 1B" manufactured by Toyo Seiki Seisaku-Sho, Ltd. at a capillary diameter of 1.0 mmφ, a capillary length of 20 mm, a winding speed of 10 m/min. and the melting completion temperature (T)+10° C.

Drawdown property: the drawdown property during blow molding was evaluated as follows.

A blow molding machine (direct blow molding machine manufactured by BEKUM Maschinenfabriken GmbH) was used to extrude cylindrical (pipe-shaped) parison at a die diameter of 25 mm and a mandrel diameter of 21 mm in a continuous manner without using an accumulator, and the drawdown state and formabilities (solidification, stretched state) of the resulting parison were evaluated according to the following criteria. Herein, the molding conditions were as follows: cylinder temperature: (melting completion temperature (T)+10)° C.; and mold temperature: 40° C. Air blowing was performed for a blowing time of 10 seconds immediately after mold clamping.

1: Parison formabilities are stable, and a molded article is obtained without drawdown.

2: While parison can be formed, severe drawdown occurs, and a remarkable thickness unevenness is observed on the molded article.

3: Parison cannot be stably formed and drawdown occurs, and remarkable molding defects (perforation, breaking) are also observed.

TABLE 1

|  | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|
| Polyamide No. | PA 1 | PA 2 | PA 3 | PA 4 | PA 5 | PA 6 | PA 11 | PA 7 | PA 8 | PA 9 | PA 10 |
| Aliphatic diamine [D] | Hexamethylenediamine | | | | | | | | | | |
| Terephthalic acid [A] mol % | 48 | 44 | 40 | 40 | 36 | 48 | 44 | 55 | 35 | 47 | 44 |
| Isophthalic acid [B] mol % | 32 | 36 | 40 | 30 | 32 | 32 | 36 | 25 | 45 | 22 | 36 |
| Adipic acid [C] mol % | 20 | 20 | 20 | 30 | 30 | — | 20 | 20 | 20 | 31 | 20 |
| Sebacic acid [C] mol % | — | — | — | — | — | 20 | — | — | — | — | — |
| Molar ratio ([A]/[B]) | 60/40 | 55/45 | 50/50 | 57/43 | 53/47 | 60/40 | 55/45 | 69/31 | 44/56 | 68/32 | 55/45 |
| Molar ratio ([C]/[B]) | 38/62 | 35/65 | 33/67 | 50/50 | 48/52 | 38/62 | 35/65 | 44/56 | 31/69 | 58/42 | 35/65 |
| Intrinsic viscosity [η] dl/g | 1.1 | 1 | 1.1 | 1.2 | 0.8 | 1 | 1.1 | 0.9 | 1.1 | 0.9 | 0.6 |
| Melting completion temperature (T) ° C. | 298 | 291 | 280 | 283 | 274 | 289 | 289 | 315 | — (Amorphous) | 303 | 288 |
| Amount of melting heat ΔH mJ/mg | 34 | 30 | 26 | 33 | 27 | 29 | 31 | 45 | — | 41 | 28 |
| Melt flow rate (T + 10° C.) g/10 min | 16 | 7 | 5 | 19 | 33 | 15 | 6 | 68 | — | 52 | 125 |
| Melt tension (T + 10° C.) mN | 15 | 19 | 18 | 13 | 7 | 20 | 20 | 2 | — | 2 | Not measurable |
| Drawdown property | 1 | 1 | 1 | 1 | 1 | 1 | 1 | 3 (Foamed) | 3 (Solidification failure) | 2 (Foamed) | 3 (Perforation) |

As shown in Table 1, the semi-aromatic polyamide in each of Examples 1 to 7 was a polyamide relatively high in melt tension and having crystallinity. Therefore, drawdown was less likely to occur during blow molding.

By contrast, when the content of terephthalic acid was higher as in the case of Comparative Example 1, the melt tension was remarkably reduced. Therefore, drawdown occurred during blow molding, and foaming occurred in the resin in melting. In addition, when the content of isophthalic acid was higher as in the case of Comparative Example 2, the crystallinity was remarkably reduced, and the polyamide was not easily solidified during melt-molding. Furthermore, also when the content of isophthalic acid was lower as in the case of Comparative Example 3, the melt tension was remarkably reduced, drawdown occurred during blow molding, and foaming occurred in the resin in melting. In Comparative Example 4, the [η] was lower and thus the melt tension was reduced, and remarkable drawdown occurred during blow molding.

It can be thus seen that the contents of the structural units of dicarboxylic acids [A] to [C] are particularly adjusted to fall within proper ranges and therefore a specific effect of enhancing the melt tension is achieved in the semi-aromatic polyamide of the present invention.

2. Semi-Aromatic Polyamide Composition 2-1. First Semi-aromatic Polyamide Resin Composition A The above polyamides (PA1 to PA10) were used as polyamide materials to prepare semi-aromatic polyamide resin compositions A shown in Table 2.

First, three olefin polymers (II) (olefin polymers (A) to (C)) were prepared.

[Olefin Polymer (A)]

A glass flask sufficiently purged with nitrogen was charged with 0.63 mg of bis(1,3-dimethylcyclopentadienyl) zirconium dichloride, and 1.57 ml of a solution of methylaminoxane in toluene (Al: 0.13 mmol/L) and 2.43 ml of toluene were further added thereto to provide a catalyst solution.

Then, to a stainless-steel autoclave having an inner volume of 2 L, sufficiently purged with nitrogen, 912 ml of hexane and 320 ml of 1-butene were introduced, and the temperature in the system was raised to 80° C. Subsequently, 0.9 mmol of aluminum triisobutyl and 2.0 ml of the catalyst solution prepared above (0.0005 mmol in terms of Zr) were placed in the system under pressure with ethylene, and polymerization reaction was started. Ethylene was continuously fed to thereby keep the total pressure at 8.0 kg/cm$^2$-G, and the polymerization was performed at 80° C. for 30 minutes.

A small amount of ethanol was introduced to the system to quench the polymerization, and thereafter the system was purged with the unreacted ethylene. The resulting solution was loaded into an excessive amount of ethanol to thereby precipitate a white solid. This white solid was recovered by filtration, and dried under reduced pressure overnight to provide a white solid (ethylene/1-butene copolymer). [Density=0.865 g/cm$^3$, MFR (ASTM D1238 standard, 190° C.: load of 2,160 g)=0.5 g/10 min., content of 1-butene structural unit: 4 mol %]

One hundred parts by weight of the resulting ethylene/1-butene copolymer was mixed with 1.0 part by weight of maleic anhydride and 0.04 parts by weight of peroxide [Perhexyne 25B, manufactured by NOF Corporation, trademark]. The resulting mixture was subjected to melt graft modification in a uniaxial extruder set at 230° C. to provide a modified-ethylene/1-butene copolymer having the following physical properties. The amount of maleic anhydride subjected to graft-modification was 0.90 wt %. The intrinsic viscosity [η] measured at 135° C. in a decalin solution was 1.98 dl/g.

[Olefin Polymer (B)]

Olefin polymer (B) was prepared in the same manner as olefin polymer (A) except that the amount of maleic anhydride to be added in modification of an unmodified ethylene/1-butene copolymer in production of olefin polymer (A) was changed to 0.5 parts by weight. The amount of maleic anhydride subjected to graft-modification was 0.50 wt %. The intrinsic viscosity [η] measured at 135° C. in a decalin solution was 1.79 dl/g.

[Olefin Polymer (C)]

An unmodified ethylene/1-butene copolymer in production of olefin polymer (A) was used as it was.

Examples 8 to 16 and Comparative Examples 5 to 8

Each polyamide (I) (PA1 to PA10), each olefin polymer (II) (olefin polymers (A) to (C)), an antioxidant "Sumilizer GA-80 (manufactured by Sumitomo Chemical Co., Ltd., product name)" and talc "Mistron Vapor talc MT (manufactured by Nihon Mistron Co., Ltd., product name, only Example 8)" were mixed using a tumbler blender in each compositional ratio shown in Table 2, the raw materials were melt-kneaded in a biaxial extruder (TEX30α manufactured by the Japan Steel Works, Ltd.) at the cylinder temperature (T+10)° C. and then extruded to form a strand, and the strand was cooled in a water bath. Thereafter, the strand was taken up by a pelletizer and cut to provide a pellet composition.

Melt flow rate: the MFR of each polyamide was measured according to ASTM D1238 procedure B under conditions of the melting completion temperature (T)+10° C. and a load of 5 kg.

Melt tension (mN): the melt tension was measured using "CAPIROGRAPH 1B" manufactured by Toyo Seiki Seisaku-Sho, Ltd. at a capillary diameter of 1.0 mmφ, a capillary length of 20 mm, a winding speed of 10 m/min. and the temperature (T)+10° C.

Bending elastic modulus: the bending elastic modulus and bending strength are those of a test piece (64 mm in length, 6 mm in width and 0.8 mm in thickness) molded using an injection molding machine under the following conditions.
Molding machine: Tuparl TR40S3A, Sodick Plustech Co., Ltd.
Cylinder temperature of molding machine: melting completion temperature (T)+10° C., mold temperature: 40° C.

The test piece molded is left to stand at a temperature of 23° C. under a nitrogen atmosphere for 24 hours, and thereafter treated in an oven at 150° C. for 2 hours. Then, the bending test is performed under an atmosphere of a temperature of 23° C. and a relative humidity of 50% by a bending tester AB5 manufactured by NTESCO at a span of 26 mm and a bending speed of 5 mm/min., to measure the bending elastic modulus and strength.

Bending strength: the bending strength was measured in the same manner as for the bending elastic modulus.

Fuel permeability (fuel permeability coefficient, g·mm/m²·day): the semi-aromatic polyamide composition produced in each of Examples and Comparative Examples was subjected to compression molding by a heat press machine under conditions of the [melting completion temperature (T)+5]° C. and 3 MPa, to prepare a sheet having a thickness of 0.5 mm A disc-like test piece having a diameter of 100 mm was cut out from the resulting sheet. The disc-like test piece was disposed in the opening portion of a SUS vessel (area of opening portion: $1.26 \times 10^{-3}$ m²) having a volume of 20 mL, in which 18 mL of CE 10 (toluene/isooctane/ethanol=45/45/10 vol %) as simulated fuel was placed, and the vessel was sealed to provide a test specimen. The test specimen was placed in a thermostat apparatus (60° C.), and the weight thereof was measured. Once the weight loss per unit time was evened out, the fuel permeability coefficient was determined by the following equation:

Fuel permeability coefficient (g·mm/m²·day)={[Loss of weight (g)]×[Thickness of sheet (mm)]}/{[Area of opening portion $1.26 \times 10^{-3}$ (m²)]× [Measurement interval (day)]}

Direct blow moldability: the drawdown property during blow molding was evaluated as follows. A large blow molding machine (direct blow molding machine manufactured by BEKUM Maschinenfabriken GmbH) was used to extrude cylindrical (pipe-shaped) parison at a die diameter of 70 mm and a mandrel diameter of 60 mm in a continuous manner without using an accumulator. The formabilities (solidification, stretched state) and drawdown state of the resulting parison were evaluated according to the following criteria. Herein, the molding conditions were as follows: cylinder temperature: (melting completion temperature (T)+10)° C.; and mold temperature: 40° C. Air blowing was performed for a blowing time of 10 seconds immediately after mold clamping.

1: Parison formabilities are stable, and a molded article is obtained without drawdown.

2: While parison can be formed, severe drawdown occurs, and a remarkable unevenness in thickness is observed on a molded article.

3: Parison cannot be stably formed and drawdown occurs, and remarkable molding defects (perforation, breaking) are also observed.

TABLE 2

|  | Example | | | | | | | | | Comparative Example | | | |
| --- | --- | --- | --- | --- | --- | --- | --- | --- | --- | --- | --- | --- | --- |
|  | 8 | 9 | 10 | 11 | 12 | 13 | 14 | 15 | 16 | 5 | 6 | 7 | 8 |
| (I) Polyamide (PA) | PA 1 | PA 2 | PA 3 | PA 4 | PA 5 | PA 6 | PA 2 | PA 2 | PA 2 | PA 7 | PA 8 | PA 9 | PA 10 |
| a. mass % | 85 | 85 | 85 | 85 | 85 | 85 | 90 | 80 | 85 | 85 | 85 | 85 | 85 |
| (II)-a Olefin polymer | A | A | A | A | A | A | A | A | B | A | A | A | A |
| a. mass % | 15 | 15 | 15 | 15 | 15 | 15 | 10 | 20 | 15 | 15 | 15 | 15 | 15 |
| b. Functional structure unit/mass % | 0.9 | 0.9 | 0.9 | 0.9 | 0.9 | 0.9 | 0.9 | 0.9 | 0.5 | 0.9 | 0.9 | 0.9 | 0.9 |
| Antioxidant (GA80)/parts by weight | 0.5 | 0.5 | 0.5 | 0.5 | 0.5 | 0.5 | 0.5 | 0.5 | 0.5 | 0.5 | 0.5 | 0.5 | 0.5 |
| Talc/parts by weight | — | — | — | — | — | — | — | — | 5 | — | — | — | — |
| Melt flow rate (T + 10° C.) | 0.7 | 0.8 | 0.7 | 0.9 | 0.6 | 0.7 | 2.5 | 0.5 | 2.1 | 21 | — | 4.1 | 51 |
| Melt tension (T + 10° C.) mN | 38.9 | 54.9 | 58.1 | 43.8 | 62.5 | 55.2 | 30.8 | 69.4 | 35.4 | 16.0 | — | 14.8 | 15.5 |
| Bending elastic modulus/MPa | 1630 | 1690 | 1670 | 1670 | 1700 | 1610 | 1950 | 1540 | 1750 | 1750 | Not moldable | 1720 | 1640 |
| Bending strength/MPa | 85.1 | 90.7 | 88.6 | 102.3 | 90.3 | 87.1 | 95.2 | 75.9 | 88.7 | 87.8 | Not moldable | 84.4 | 61.0 |
| Fuel permeability coefficient (g · mm/m² · day) | 7.3 | 6.5 | 6.1 | 9.0 | 8.5 | 8.3 | 5.1 | 11.1 | 10.2 | 10.1 | — | 20.2 | 35.1 (Film NG) |

TABLE 2-continued

| | Example | | | | | | | | | Comparative Example | | | |
|---|---|---|---|---|---|---|---|---|---|---|---|---|---|
| | 8 | 9 | 10 | 11 | 12 | 13 | 14 | 15 | 16 | 5 | 6 | 7 | 8 |
| Direct blow moldability | 1 | 1 | 1 | 1 | 1 | 1 | 1 | 1 | 1 | 3 | 3 | 3 | 3 |

As shown in Examples 8 to 16 in Table 2, the semi-aromatic polyamide resin composition containing any of polyamides PA1 to PA5 as semi-aromatic polyamide (I), and containing semi-aromatic polyamide (I) and olefin polymer (II)-a in a predetermined ratio was high in melt tension and good in direct blow moldability (no drawdown of parison occurred).

By contrast, in the semi-aromatic polyamide resin compositions in Comparative Example 5 to 8, the composition of the semi-aromatic polyamide included therein is not properly adjusted. Specifically, polyamide PA7 included in the semi-aromatic polyamide resin composition in Comparative Example 5 had a high content of terephthalic acid, and thus the melt tension of the composition was remarkably reduced. Polyamide PA8 included in the semi-aromatic polyamide resin composition in Comparative Example 6 had a high content of isophthalic acid, and thus the crystallinity of the composition was remarkably reduced, making solidification during melt-molding difficult. Polyamide PA9 included in the semi-aromatic polyamide resin composition in Comparative Example 7 had a low content of isophthalic acid, and the melt tension was remarkably reduced and drawdown occurred during blow molding.

Polyamide PA10 included in the semi-aromatic polyamide resin composition in Comparative Example 8 had an excessively low intrinsic viscosity [η], and thus the melt tension was low and drawdown occurred during blow molding. The bending strength of a molded product was also low, and the fuel permeability coefficient was higher.

2-2. First Semi-Aromatic Polyamide Resin Composition B

The above polyamides (PA1 to PA5 and PA7 to PA10) were used as polyamide materials to prepare semi-aromatic polyamide resin compositions B shown in Table 3.

Examples 17 to 24 and Comparative Examples 9 to 12

Each polyamide (I) (PA1 to PA5 and PA7 to PA10), each olefin polymer (II)-a (olefin polymers (A) and (B)), each olefin polymer (II)-b (olefin polymer (C)), an antioxidant "Sumilizer GA-80 (manufactured by Sumitomo Chemical Co., Ltd., product name)" and talc "Mistron Vapor talc MT (manufactured by Nihon Mistron Co., Ltd., product name, only Example 8)" were mixed using a tumbler blender in each compositional ratio shown in Table 3, the raw materials were melt-kneaded in a biaxial extruder (TEX30α manufactured by the Japan Steel Works, Ltd.) at the cylinder temperature (T+10)° C. and then extruded to form a strand, and the strand was cooled in a water bath. Thereafter, the strand was taken up by a pelletizer and cut to provide a pellet composition.

Melt flow rate: the MFR of each polyamide was measured according to ASTM D1238 procedure B under conditions of the melting completion temperature (T)+10° C. and a load of 10 kg.

Melt tension (mN): the melt tension was measured using "CAPIROGRAPH 1B" manufactured by Toyo Seiki Seisaku-Sho, Ltd. at a capillary diameter of 1.0 mmφ, a capillary length of 20 mm, a winding speed of 3 m/min. and the temperature (T)+10° C.

Bending elastic modulus: the bending elastic modulus and bending strength are those of a test piece (64 mm in length, 6 mm in width and 0.8 mm in thickness) molded using an injection molding machine under the following conditions.

Molding machine: Tuparl TR40S3A, Sodick Plustech Co., Ltd.

Cylinder temperature of molding machine: melting completion temperature (T)+10° C., mold temperature: 40° C.

The test piece molded was left to stand at a temperature of 23° C. under a nitrogen atmosphere for 24 hours, and thereafter treated in an oven at 150° C. for 2 hours. Then, the bending test was performed under an atmosphere of a temperature of 23° C. and a relative humidity of 50% by a bending tester AB5 manufactured by NTESCO at a span of 26 mm and a bending speed of 5 mm/min., to measure the bending elastic modulus and strength.

Bending strength: the bending strength was measured in the same manner as for the bending elastic modulus.

IZOD impact strength: the following injection molding machine was used to produce a notched test piece having a thickness of 3.2 mm adjusted under the following molding conditions. The test piece molded was left to stand at a temperature of 23° C. under a nitrogen atmosphere for 24 hours, and thereafter treated in an oven at 150° C. for 2 hours. This test piece was used to measure the IZOD impact strength under an atmosphere of a temperature of 23° C. and a relative humidity of 50% according to ASTM D256.

Molding machine: SE50DU manufactured by Sumitomo Heavy Industries, Ltd.

Cylinder temperature of molding machine: (melting completion temperature (T)+10)° C., mold temperature: 40° C.

Deflection temperature under load: the following injection molding machine was used to produce a test piece having a thickness of 3.2 mm adjusted under the following molding conditions. The test piece molded was left to stand at a temperature of 23° C. under a nitrogen atmosphere for 24 hours, and thereafter treated in an oven at 150° C. for 2 hours. This test piece was used for measurement according to ASTM D648, and the temperature was measured at which the deflection under load reached 0.254 mm with the test piece being loaded with a bending stress of 1.82 MPa and heated at a rate of 2° C./min.

Molding machine: SE50DU manufactured by Sumitomo Heavy Industries, Ltd.

Cylinder temperature of molding machine: (melting completion temperature (T)+10)° C., mold temperature: 40° C.

TABLE 3

|  | Example | | | | | | | | Comparative Example | | | |
| --- | --- | --- | --- | --- | --- | --- | --- | --- | --- | --- | --- | --- |
|  | 17 | 18 | 19 | 20 | 21 | 22 | 23 | 24 | 9 | 10 | 11 | 12 |
| (I) Polyamide (PA) | PA 1 | PA 2 | PA 3 | PA 4 | PA 5 | PA 2 | PA 2 | PA 2 | PA 7 | PA 8 | PA 9 | PA 10 |
| a. mass % | 60 | 60 | 60 | 60 | 60 | 60 | 70 | 50 | 60 | 60 | 60 | 60 |
| (II)-a Olefin polymer | B | B | B | B | B | A | B | B | B | B | B | B |
| a. mass % | 20 | 20 | 20 | 20 | 20 | 10 | 15 | 25 | 20 | 20 | 20 | 20 |
| b. Functional structure unit/mass % | 0.5 | 0.5 | 0.5 | 0.5 | 0.5 | 0.9 | 0.5 | 0.5 | 0.5 | 0.5 | 0.5 | 0.5 |
| (II)-b Olefin polymer | C | C | C | C | C | C | C | C | C | C | C | C |
| a. mass % | 20 | 20 | 20 | 20 | 20 | 30 | 15 | 25 | 20 | 20 | 20 | 20 |
| b. Functional structure unit/mass % | 0 | 0 | 0 | 0 | 0 | 0 | 0 | 0 | 0 | 0 | 0 | 0 |
| Functional structure unit in mixture/mass % | 0.25 | 0.25 | 0.25 | 0.25 | 0.25 | 0.225 | 0.25 | 0.25 | 0.25 | 0.25 | 0.25 | 0.25 |
| Antioxidant (GA80)/parts by weight | 0.5 | 0.5 | 0.5 | 0.5 | 0.5 | 0.5 | 0.5 | 0.5 | 0.5 | 0.5 | 0.5 | 0.5 |
| Melt flow rate (T + 10° C.) g/10 min | 4.8 | 5.5 | 5.0 | 7.2 | 5.3 | 7.1 | 12.8 | 7.3 | 21 | — | 19 | 69 |
| Melt tension (T + 10° C.) mN | 48 | 62 | 69 | 40 | 69 | 62 | 51 | 66 | 23 | — | 29 | 13 |
| Bending strength/MPa | 42 | 44 | 43 | 47 | 45 | 41 | 70 | 25 | 50 | Not moldable | 49 | 37 |
| Bending elastic modulus/MPa | 920 | 900 | 930 | 880 | 870 | 960 | 1260 | 410 | 990 | | 980 | 910 |
| IZOD IMPACT STRENGTH J/m | 800 | 820 | 820 | 840 | 850 | 800 | 950 | NB | 780 | | 790 | 750 |
| Deflection temperature under load ° C. | 99 | 98 | 99 | 90 | 89 | 97 | 103 | 90 | 97 | | 88 | 94 |

As shown in Table 3, it is found that the semi-aromatic polyamide resin compositions in Examples 17 to 24, each including the semi-aromatic polyamide of the present invention, and both olefin polymer (II)-a including a functional structure unit and olefin polymer (II)-b including no functional structure unit, are higher in melt tension, and also have higher impact strength and deflection temperature under load than the semi-aromatic polyamide resin compositions in Comparative Examples 9 to 12 which are free from the semi-aromatic polyamide of the present invention.

(2-2) Second Semi-aromatic Polyamide Resin Composition

Polyamides (I) (PA1 to PA5 and PA7 to PA10) were used as polyamide materials to prepare polyamide resin compositions shown in Tables 4 and 5.

Glycidyl group-containing polymer (IV) was synthesized by the following method.

[Polymer (G-1)]

The oil jacket temperature of a 1-L pressure stirred tank reactor equipped with an oil jacket was kept at 200° C. A raw material tank was charged with a monomer mixed liquid including 90 parts by mass of styrene (hereinafter, referred to as "St"), 10 parts by mass of glycidyl methacrylate (hereinafter, referred to as "GMA"), 15 parts by mass of xylene and 0.5 parts by mass of di-tertiary-butyl peroxide (hereinafter, referred to as "DTBP") as a polymerization initiator. The monomer mixed liquid was continuously fed from the raw material tank to the reactor at a constant feed rate (48 g/min, retention time: 12 min), and the reaction liquid was continuously extracted from the outlet of the reactor so that the mass of the content liquid in the reactor was constant at about 580 g. The temperature in the reactor was here kept at about 210° C. After a lapse of 36 minutes since the temperature in the reactor was stabilized, the reaction liquid extracted was continuously subjected to removal of a volatile component by a film evaporator kept at a reduced pressure of 30 kPa and a temperature of 250° C., to recover polymer (B-1) including almost no volatile component.

Polymer (B-1) obtained had a mass average molecular weight of 7,500 and a number average molecular weight of 2,900 by GPC analysis (in terms of polystyrene). The content of the glycidyl group-containing structural unit was 9.5 mass %.

[Polymer (G-2)]

Polymer (B-2) was produced by the same method as in the production of polymer (B-1) except that a monomer mixed liquid including 78 parts by mass of St, 22 parts by mass of GMA, 15 parts by mass of xylene and 0.3 parts by mass of DTBP was used.

Polymer (B-2) obtained had a mass average molecular weight of 8,700 and a number average molecular weight of 3,000 by GPC analysis (in terms of polystyrene). The content of the glycidyl group-containing structural unit was 20.8 mass %.

Examples 25 to 34 and Comparative Examples 13 to 16

Each polyamide (I) (PA1 to PA5 and PA7 to PA10), polymer (IV), and heat resistant stabilizer (V) "copper(I) iodide (manufactured by Wako Pure Chemical Industries, Ltd.)" and "potassium iodide (manufactured by Wako Pure Chemical Industries, Ltd.)" were mixed using a tumbler blender in each compositional ratio to be shown in Tables 4 and 5, the raw materials were melt-kneaded in a biaxial extruder (TEX30α manufactured by the Japan Steel Works, Ltd.) at the cylinder temperature (T+10)° C. and then extruded to form a strand, and the strand was cooled in a water bath. Fibrous reinforcing material (III) "glass fiber (CS03JAFT2A, manufactured by Asahi Fiber Glass Co., Ltd.)" here was loaded through a vent port by side-feed addition. Thereafter, the strand was taken up by a pelletizer and cut to provide a pellet composition.

Melt flow rate: the MFR of each polyamide was measured according to JIS K7210 under conditions of the melting completion temperature (T)+10° C. and a load of 10 kg.

Bending elastic modulus: the bending elastic modulus and bending strength are those of a test piece (64 mm in length, 6 mm in width and 0.8 mm in thickness) molded using an injection molding machine under the following conditions.

Molding machine: Tuparl TR40S3A, Sodick Plustech Co., Ltd.
Cylinder temperature of molding machine: melting completion temperature (T)+10° C., mold temperature: 40° C.

The test piece molded was left to stand at a temperature of 23° C. under a nitrogen atmosphere for 24 hours, and thereafter treated in an oven at 150° C. for 2 hours. Then, the bending test was performed under an atmosphere of a temperature of 23° C. and a relative humidity of 50% by a bending tester AB5 manufactured by NTESCO at a span of 26 mm and a bending speed of 5 mm/min., to measure the bending elastic modulus and strength.

Bending strength: the bending strength was measured in the same manner as for the bending elastic modulus.

Direct blow moldability: the drawdown property during blow molding was evaluated as follows. A large blow molding machine (direct blow molding machine manufactured by BEKUM Maschinenfabriken GmbH) was used to extrude cylindrical (pipe-shaped) parison at a die diameter of 70 mm and a mandrel diameter of 60 mm in a continuous manner without using an accumulator. The formabilities (solidification, stretched state) and drawdown state of the resulting parison were evaluated according to the following criteria. Herein, the molding conditions were as follows: cylinder temperature: (melting completion temperature (T)+10)° C.; and mold temperature: 40° C. Air blowing was performed for a blowing time of 10 seconds immediately after mold clamping.
1: Parison formabilities are stable, and a molded article is obtained without drawdown.
2: Parison cannot be stably formed and drawdown occurs, and remarkable molding defects (perforation, breaking) are also observed.

Appearance of inner surface of molded article (scuffing due to glass fiber): the inner surface of each molded article was observed and evaluated according to the following criteria.
1: No scuffing is observed and a smooth design surface is observed.
2: Scuffing is remarkably observed and irregularities are observed.

TABLE 4

| | Example | | | | | | | | | |
|---|---|---|---|---|---|---|---|---|---|---|
| | 25 | 26 | 27 | 28 | 29 | 30 | 31 | 32 | 33 | 34 |
| (I) Semi-aromatic polyamide resin (PA) | PA 1 | PA 2 | PA 3 | PA 4 | PA 5 | PA 2 | PA 2 | PA 2 | PA 2 | PA 2 |
| mass % | 70 | 70 | 70 | 70 | 70 | 80 | 60 | 70 | 70 | 70 |
| (III) Fibrous reinforcing material | | | | | | | | | | |
| mass % | 30 | 30 | 30 | 30 | 30 | 20 | 40 | 30 | 30 | 30 |
| (IV) Glycidyl group-containing polymer | | | | | | | | G-1 | G-2 | G-1 |
| parts by mass | — | — | — | — | — | — | — | 1 | 0.5 | 1 |
| Structural unit/mass % | | | | | | | | 9.5 | 20.8 | 9.5 |
| Expression (A)/mass % | | | | | | | | 0.09 | 0.10 | 0.09 |
| (V) Heat stabilizer/parts by mass | | | | | | | | | | |
| Copper iodide | 0.05 | 0.05 | 0.05 | 0.05 | 0.05 | 0.05 | 0.05 | 0.05 | 0.05 | 0 |
| Potassium iodide | 0.45 | 0.45 | 0.45 | 0.45 | 0.45 | 0.45 | 0.45 | 0.45 | 0.45 | 0 |
| Melt flow rate (T + 10° C.) g/10 min. | 9.0 | 8.8 | 10.4 | 11.6 | 11.1 | 12.5 | 7.1 | 5.6 | 7.1 | 7.4 |
| Bending elastic modulus/MPa | 9445 | 8886 | 8555 | 9335 | 8821 | 6985 | 11800 | 8990 | 8613 | 8850 |
| Bending strength/MPa | 232 | 215 | 209 | 217 | 211 | 188 | 220 | 215 | 210 | 205 |
| Direct blow moldability | 1 | 1 | 1 | 1 | 1 | 1 | 1 | 1 | 1 | 1 |
| Appearance of inner surface of molded article | 1 | 1 | 1 | 1 | 1 | 1 | 1 | 1 | 1 | 1 |

TABLE 5

| | Comparative Example | | | |
|---|---|---|---|---|
| | 13 | 14 | 15 | 16 |
| (I) Semi-aromatic polyamide resin (PA) | PA 7 | PA 8 | PA 9 | PA 10 |
| mass % | 70 | 70 | 70 | 70 |
| (III) Fibrous reinforcing material | | | | |
| mass % | 30 | 30 | 30 | 30 |
| (IV) Glycidyl group-containing polymer | | | | |
| • parts by mass | — | — | — | — |
| • Structural unit/mass % | | | | |
| • Expression (A)/mass % | | | | |
| (V) Heat stabilizer/parts by mass | | | | |
| • Copper iodide | 0.05 | 0.05 | 0.05 | 0.05 |
| • Potassium iodide | 0.45 | 0.45 | 0.45 | 0.45 |
| Melt flow rate (T + 10° C.) g/10 min. | Not measurable | Not measurable | 51.5 | 77.0 |
| Bending elastic modulus/MPa | 9980 | 600 | 9500 | 8560 |
| Bending strength/MPa | 222 | 144 | 210 | 179 |
| Direct blow moldability | 2 | 2 | 2 | 2 |
| Appearance of inner surface of molded article | 2 | 2 | 2 | 2 |

As shown in Table 4, good results were obtained in Examples 25 to 34 with respect to all the evaluation items.

From the results in Examples 25 to 34 and Comparative Example 16, it was established to be important in all the evaluation items that the intrinsic viscosity of semi-aromatic polyamide (I) falls within the range defined by the present invention.

From the results in Examples 25 to 34 and Comparative Examples 13 to 15, it was established to be important in all the evaluation items that the ratio of the structural unit derived from terephthalic acid [A] to the structural unit derived from isophthalic acid [B] ([A]/[B]) in semi-aromatic polyamide (I) falls within the range defined by the present invention.

From the results in Example 25 and Examples 32 and 33, it was established that glycidyl group-containing polymer (IV) is added to result in a reduction in melt flow rate.

The present application claims the priority based on Japanese Patent Application No. 2012-248592 filed on Nov. 12, 2012, Japanese Patent Application No. 2012-248596 filed on Nov. 12, 2012 and Japanese Patent Application No. 2013-017052 filed on Jan. 31, 2013, the contents of which including the specification and drawings are herein incorporated by reference in their entirety.

INDUSTRIAL APPLICABILITY

A composition including the semi-aromatic polyamide of the present invention is easily applied to various molding procedures such as blow molding, and is particularly suitably used for molding of, for example, a hollow member having a pipe shape.

REFERENCE SIGNS LIST

10 Melt extruder
20 Die
30 Mold
40 Parison

The invention claimed is:

1. A semi-aromatic polyamide (I) comprising:
a structural unit derived from terephthalic acid [A];
a structural unit derived from isophthalic acid [B];
a structural unit derived from $C_{4-10}$ aliphatic dicarboxylic acid [C]; and
a structural unit derived from $C_{4-12}$ aliphatic diamine [D];
wherein:
the semi-aromatic polyamide (I) comprises 35 to 50 mol % of the structural unit derived from terephthalic acid [A], 25 to 40 mol % of the structural unit derived from isophthalic acid [B], and 15 to 35 mol % of the structural unit derived from aliphatic dicarboxylic acid [C] provided that a sum of [A], [B] and [C] is 100 mol %;
a molar ratio of the structural unit derived from terephthalic acid [A] to the structural unit derived from isophthalic acid [B] ([A]/[B]) is 65/35 to 50/50 and a molar ratio of the structural unit derived from aliphatic dicarboxylic acid [C] to the structural unit derived from isophthalic acid [B] ([C]/[B]) is 30/70 to 50/50; and
an amount of melting heat (ΔH) of the semi-aromatic polyamide (I) obtained by differential scanning calorimetry (DSC) is 20 to 40 mJ/mg and an intrinsic viscosity [i] of the semi-aromatic polyamide (I) is 0.7 to 1.2 dl/g, and
the semi-aromatic polyamide (I) is produced by a method comprising a step of reacting dicarboxylic acid components containing the terephthalic acid [A], the isophthalic acid [B], and the aliphatic dicarboxylic acid [C] with a diamine component containing the $C_{4-12}$ aliphatic diamine [D] in the presence of a molecular weight modifier selected from the group consisting of a monocarboxylic acid and a monoamine.

2. The semi-aromatic polyamide (I) according to claim 1, wherein:
aliphatic dicarboxylic acid [C] is adipic acid or sebacic acid.

3. The semi-aromatic polyamide (I) according to claim 1, wherein:
aliphatic diamine [D] is a $C_{6-9}$ linear diamine.

4. The semi-aromatic polyamide (I) according to claim 1, wherein:
aliphatic diamine [D] is hexamethylenediamine.

5. The semi-aromatic polyamide (I) according to claim 1, wherein:
a melting completion temperature (T) determined by differential scanning calorimetry (DSC) is 250 to 300° C.

6. The semi-aromatic polyamide (I) according to claim 1, wherein:
a melt flow rate (T+10° C.) of the semi-aromatic polyamide at a melting completion temperature (T)+10 (° C.) as determined by differential scanning calorimetry (DSC) is 1 to 50 g/10 min; and
a melt tension (T+10° C.) of the semi-aromatic polyamide at a melting completion temperature (T)+10 (° C.) as determined by differential scanning calorimetry (DSC) is 3 to 30 mN.

7. A semi-aromatic polyamide resin composition comprising:
35 to 72 mass % of the semi-aromatic polyamide (I) according to claim 1; and
28 to 65 mass % of a mixture of olefin polymer (II)-a comprising 0.3 to 1.5 mass % of a functional structure unit and olefin polymer (II)-b comprising no functional structure unit, the mixture having a content of the functional structure unit of 0.15 to 0.50 mass %, provided that a sum of (I), (II)-a and (II)-b is 100 mass %.

8. A molded article comprising:
the semi-aromatic polyamide resin composition according to claim 7.

9. A semi-aromatic polyamide resin composition comprising:
50 to 80 mass % of the semi-aromatic polyamide (I) according to claim 1; and
20 to 50 mass % of fibrous reinforcing material (III), provided that a sum of (I) and (III) is 100 mass %.

10. The semi-aromatic polyamide resin composition according to claim 9, wherein:
fibrous reinforcing material (III) is a glass fiber.

11. A molded article comprising:
the semi-aromatic polyamide resin composition according to claim 9.

12. An air intake/exhaust system component comprising:
the semi-aromatic polyamide resin composition according to claim 9.

13. An automobile cooling system component comprising:
the semi-aromatic polyamide resin composition according to claim 9.

14. A semi-aromatic polyamide resin composition comprising:

the semi-aromatic polyamide (I) according to claim 1; and 0.3 to 1.5 parts by mass of glycidyl group-containing polymer (IV) comprising 5 to 30 mass % of a glycidyl group-containing structural unit, based on 100 parts by mass of the semi-aromatic polyamide resin composition; and a content (mass %) of the glycidyl group-containing structural unit of the semi-aromatic polyamide resin composition satisfies the following Expression A:

0.05<content (mass %) of glycidyl group-containing structural unit<0.18    (A).

15. The semi-aromatic polyamide resin composition according to claim 14, wherein:
the glycidyl group-containing structural unit of glycidyl group-containing polymer (IV) is a structural unit derived from glycidyl methacrylate.

16. A semi-aromatic polyamide resin composition comprising:
the semi-aromatic polyamide (I) according to claim 1; and heat resistant stabilizer (V).

17. The semi-aromatic polyamide resin composition according to claim 16, wherein:
heat resistant stabilizer (V) comprises copper iodide and potassium iodide.

18. A hollow body comprising:
the semi-aromatic polyamide (I) according to claim 1.

19. A method for producing the semi-aromatic polyamide resin according to claim 1, the method comprising:
feeding a mixture that comprises a dicarboxylic acid component containing 35 to 50 mol % of terephthalic acid [A], 25 to 40 mol % of isophthalic acid [B] and 15 to 35 mol % of aliphatic dicarboxylic acid [C], a molar ratio of terephthalic acid [A] to isophthalic acid [B] ([A]/[B]) being 65/35 to 50/50 and a molar ratio of aliphatic dicarboxylic acid [C] to isophthalic acid [B] ([C]/[B]) being 30/70 to 50/50, a diamine component containing $C_{4-12}$ aliphatic diamine [D], and 0 to 90 mass % of water to a batch or continuous reactor to subject the mixture to polycondensation under pressure and heating under conditions of a pressure in the reactor of 0.5 to 4.0 MPa and a temperature of 150 to 260° C. and in the presence of a molecular weight modifier selected from the group consisting of a monocarboxylic acid and a monoamine, providing a low-degree condensate; and
subjecting the low-degree condensate to a high degree of polymerization by maintaining at a pressure of 0.5 to 4.0 MPa and heating to a temperature ranging from a melting point of a polyamide to be produced to the melting point+100° C., while removing water generated by polycondensation.

20. A semi-aromatic polyamide resin composition comprising:
72 to 93 mass % of a semi-aromatic polyamide (I); and
7 to 28 mass % of an olefin polymer (II)-a including 0.3 to 1.5 mass % of a functional structure unit, provided that a sum of (I) and (II)-a is 100 mass %, wherein
the semi-aromatic polyamide (I) comprises:
a structural unit derived from terephthalic acid [A];
a structural unit derived from isophthalic acid [B];
a structural unit derived from $C_{4-10}$ aliphatic dicarboxylic acid [C]; and
a structural unit derived from $C_{4-12}$ aliphatic diamine [D]; wherein:
the semi-aromatic polyamide (I) comprises 35 to 50 mol % of the structural unit derived from terephthalic acid [A], 25 to 40 mol % of the structural unit derived from isophthalic acid [B], and 15 to 35 mol % of the structural unit derived from aliphatic dicarboxylic acid [C] provided that a sum of [A], [B] and [C] is 100 mol %;
a molar ratio of the structural unit derived from terephthalic acid [A] to the structural unit derived from isophthalic acid [B] ([A]/[B]) is 65/35 to 50/50 and a molar ratio of the structural unit derived from aliphatic dicarboxylic acid [C] to the structural unit derived from isophthalic acid [B] ([C]/[B]) is 30/70 to 50/50; and
an amount of melting heat (ΔH) of the semi-aromatic polyamide (I) obtained by differential scanning calorimetry (DSC) is 20 to 40 mJ/mg and an intrinsic viscosity [i] of the semi-aromatic polyamide (I) is 0.7 to 1.2 dl/g, and
the semi-aromatic polyamide (I) is produced by a method comprising a step of reacting dicarboxylic acid components containing the terephthalic acid [A], the isophthalic acid [B], and the aliphatic dicarboxylic acid [C] with a diamine component containing the $C_{4-12}$ aliphatic diamine [D] in the presence of a molecular weight modifier selected from the group consisting of a monocarboxylic acid and a monoamine.

21. The semi-aromatic polyamide resin composition according to claim 20, wherein:
a functional group of olefin polymer (II)-a is a functional group selected from carboxylic acid, ester, ether, aldehyde and ketone.

22. The semi-aromatic polyamide resin composition according to claim 21, wherein:
olefin polymer (II)-a comprises a structural unit derived from maleic anhydride.

23. A molded article comprising:
the semi-aromatic polyamide resin composition according to claim 20.

* * * * *